(12) United States Patent
Takiwaki et al.

(10) Patent No.: US 11,394,882 B2
(45) Date of Patent: Jul. 19, 2022

(54) DISPLAY CONTROL DEVICE, DISPLAY CONTROL METHOD, AND PROGRAM

(71) Applicant: JVCKENWOOD Corporation, Yokohama (JP)

(72) Inventors: Aiko Takiwaki, Yokohama (JP); Masaya Mihara, Yokohama (JP); Daisuke Hachiri, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/151,768

(22) Filed: Jan. 19, 2021

(65) Prior Publication Data

US 2021/0144301 A1 May 13, 2021

Related U.S. Application Data

(63) Continuation of application No. PCT/JP2019/028316, filed on Jul. 18, 2019.

(30) Foreign Application Priority Data

Jul. 20, 2018 (JP) .............................. JP2018-137043

(51) Int. Cl.
*H04N 5/232* (2006.01)
(52) U.S. Cl.
CPC ..... *H04N 5/23238* (2013.01); *H04N 5/23293* (2013.01)
(58) Field of Classification Search
CPC .. H04N 5/23238; H04N 21/4316; G09G 5/14; G06F 3/011; G06F 3/04845
See application file for complete search history.

(56) References Cited

U.S. PATENT DOCUMENTS 7,552,011 B2 * 6/2009 Ishii ..................... G01C 21/32
340/995.1
9,575,626 B2 * 2/2017 Kozakura ........... G06F 3/04817
(Continued)

FOREIGN PATENT DOCUMENTS

JP 2011-145407 7/2011
JP 2012-018237 1/2012
(Continued)

OTHER PUBLICATIONS

International Search Report and Written Opinion for International Application No. PCT/JP2019/028316 dated Sep. 10, 2019, 12 pages.
(Continued)

*Primary Examiner* — Boubacar Abdou Tchoussou
(74) *Attorney, Agent, or Firm* — Amin, Turocy & Watson, LLP

(57) ABSTRACT

From captured images, a scene desired by a viewer is appropriately detected. A display control device includes: an image information acquisition unit 60 that acquires information on a plurality of images captured during movement; a set time designation unit 66 that designates a plurality of set times based on the information on images; a thumbnail acquisition unit 68 that acquires the images captured at the set times as thumbnails; and a display image generation unit 70 that generates a display image to be displayed on a display unit so that the plurality of acquired thumbnails are arrayed in a predetermined direction in image-capturing time-series order while being displayed side by side in a direction different from the predetermined direction based on position information indicating positions at which the images are captured.

10 Claims, 10 Drawing Sheets

(56) References Cited

U.S. PATENT DOCUMENTS

| | | | |
|---|---|---|---|
| 9,986,156 B2* | 5/2018 | Kimura | H04N 5/23238 |
| 10,706,632 B2* | 7/2020 | Kumar | G06T 3/0025 |
| 10,818,055 B2* | 10/2020 | Itoi | G06K 9/00671 |
| 10,841,654 B2* | 11/2020 | Lee | G06T 11/00 |
| 10,917,604 B2* | 2/2021 | Takehara | H04N 7/18 |
| 2006/0001771 A1 | 1/2006 | Hayakawa | |
| 2006/0167629 A1* | 7/2006 | Ishii | G01C 21/32 |
| | | | 701/455 |
| 2011/0113384 A1* | 5/2011 | Gotcher | G06F 3/04815 |
| | | | 715/851 |
| 2012/0011464 A1 | 1/2012 | Hayashi et al. | |
| 2012/0030630 A1* | 2/2012 | Grossman | G06T 19/003 |
| | | | 715/850 |
| 2014/0344758 A1* | 11/2014 | Kozakura | G06F 16/51 |
| | | | 715/835 |
| 2014/0375760 A1* | 12/2014 | Lee | H04N 5/232933 |
| | | | 348/36 |
| 2016/0073022 A1 | 3/2016 | Kimura | |
| 2016/0080647 A1* | 3/2016 | Kimura | G06T 3/4038 |
| | | | 348/36 |
| 2018/0032830 A1* | 2/2018 | Kim | G06F 3/04883 |
| 2018/0174356 A1* | 6/2018 | You | G06T 15/20 |
| 2018/0205885 A1 | 7/2018 | Kimura | |
| 2019/0098248 A1* | 3/2019 | Takehara | H04N 5/268 |
| 2019/0147631 A1* | 5/2019 | Itoi | G06K 9/2063 |
| | | | 345/633 |
| 2019/0147657 A1* | 5/2019 | Kumar | G06T 15/10 |
| | | | 345/419 |
| 2019/0179511 A1 | 6/2019 | Shimada et al. | |
| 2019/0186941 A1* | 6/2019 | Cho | G01C 21/3605 |
| 2020/0186743 A1* | 6/2020 | Lee | G06K 9/00778 |

FOREIGN PATENT DOCUMENTS

| | | |
|---|---|---|
| JP | 2012-099906 | 5/2012 |
| JP | 2013-235395 | 11/2013 |
| WO | 2005/027509 | 3/2005 |
| WO | 2014/178233 | 11/2014 |
| WO | 2018/043135 | 3/2018 |

OTHER PUBLICATIONS

Japanese Office Action for Japanese Patent Application No. 2018-137043 dated Aug. 31, 2021.

Japanese Final Office Action for Japanese Patent Application No. 2018-137043 dated Dec. 7, 2021.

* cited by examiner

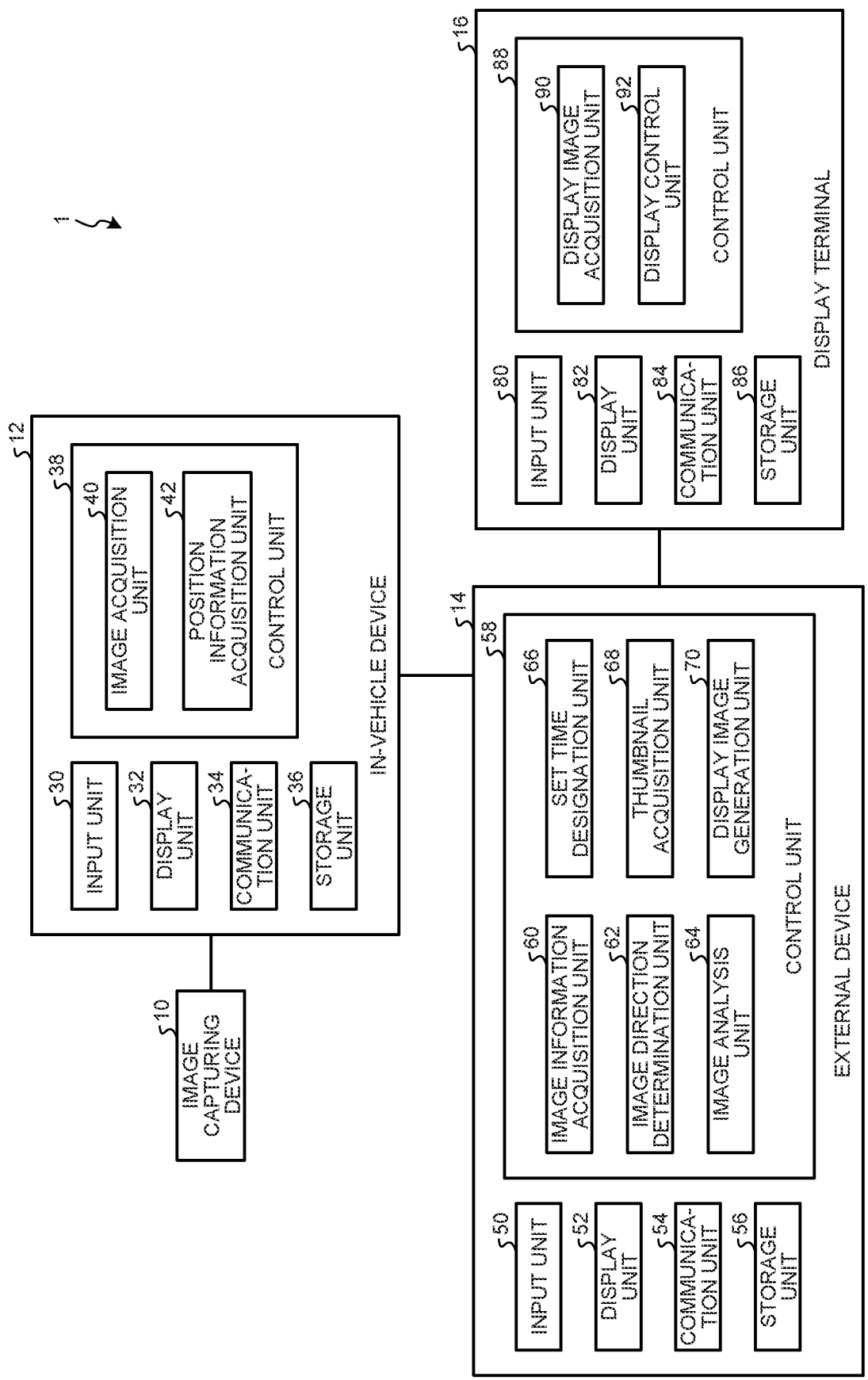

IMAGE REPRODUCTION MODE

FIG.9
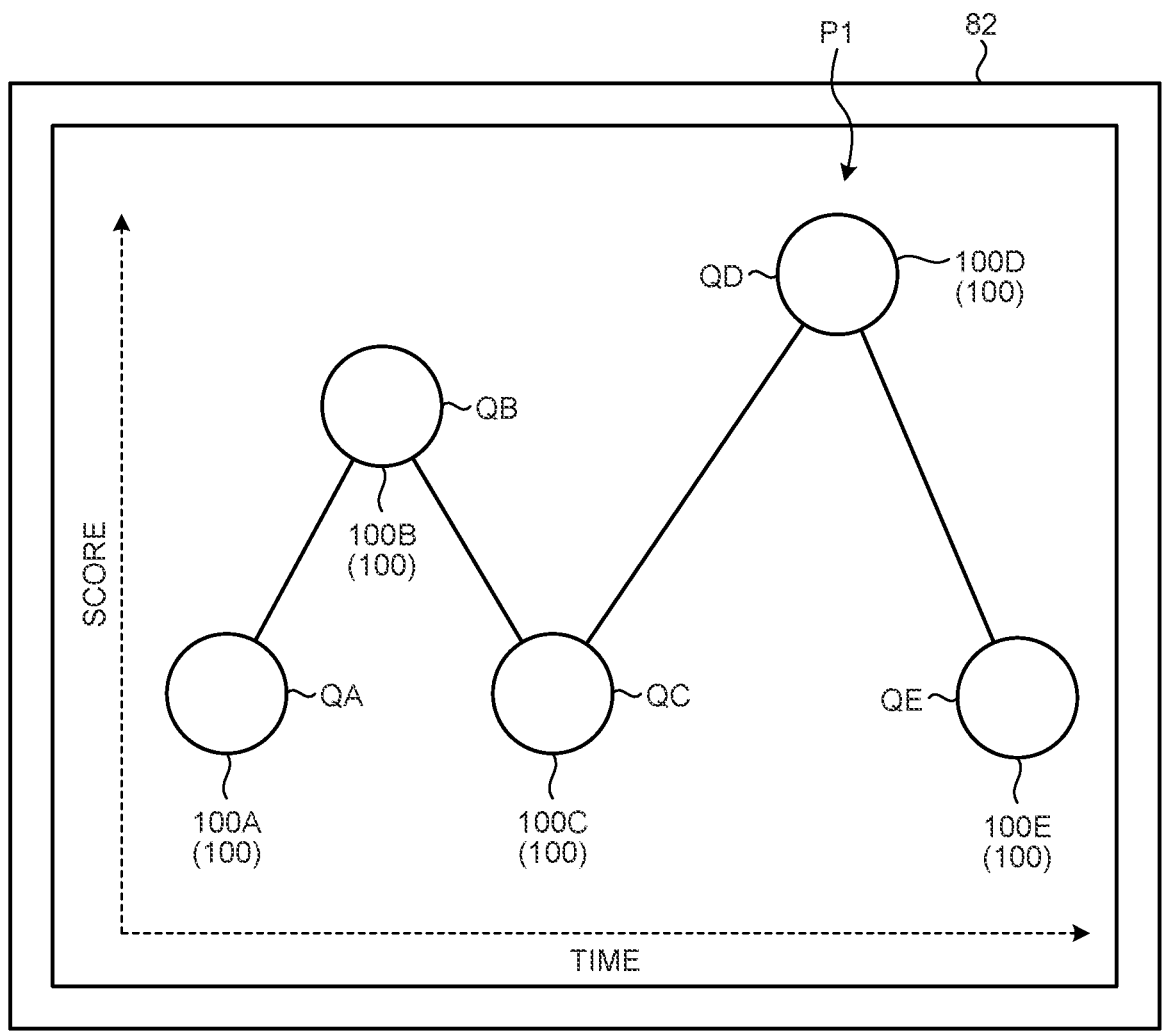
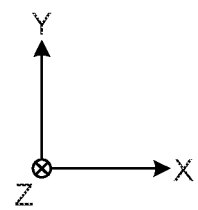

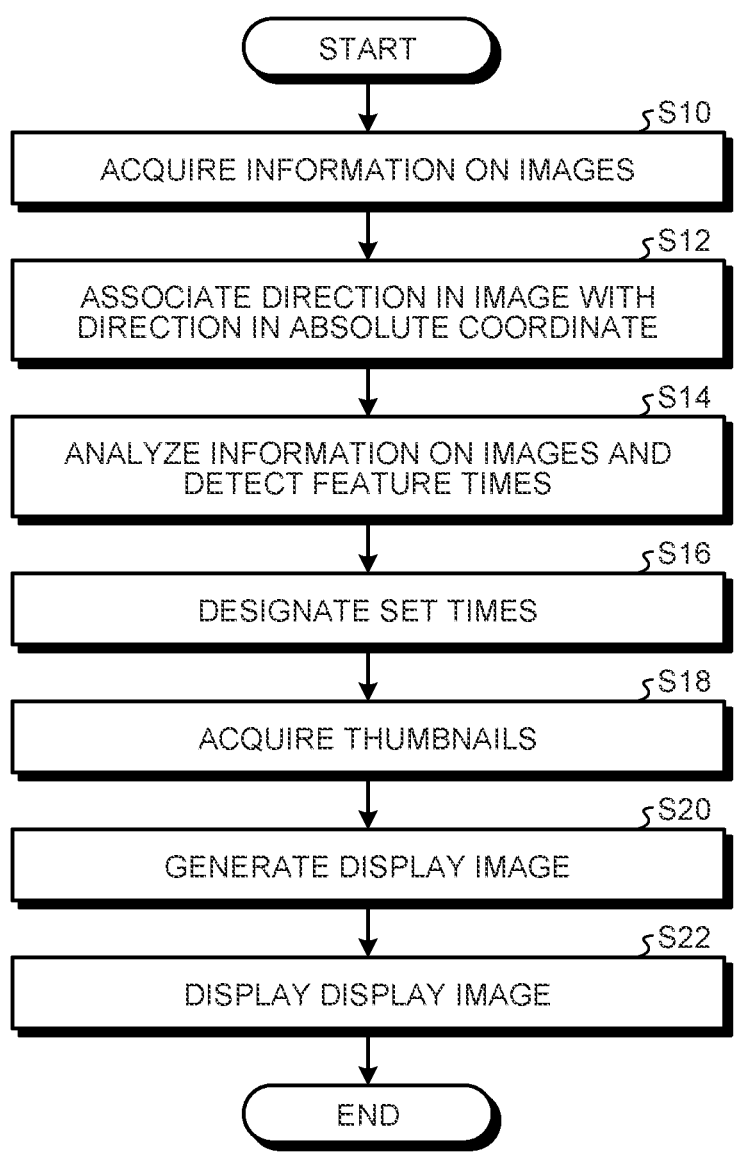

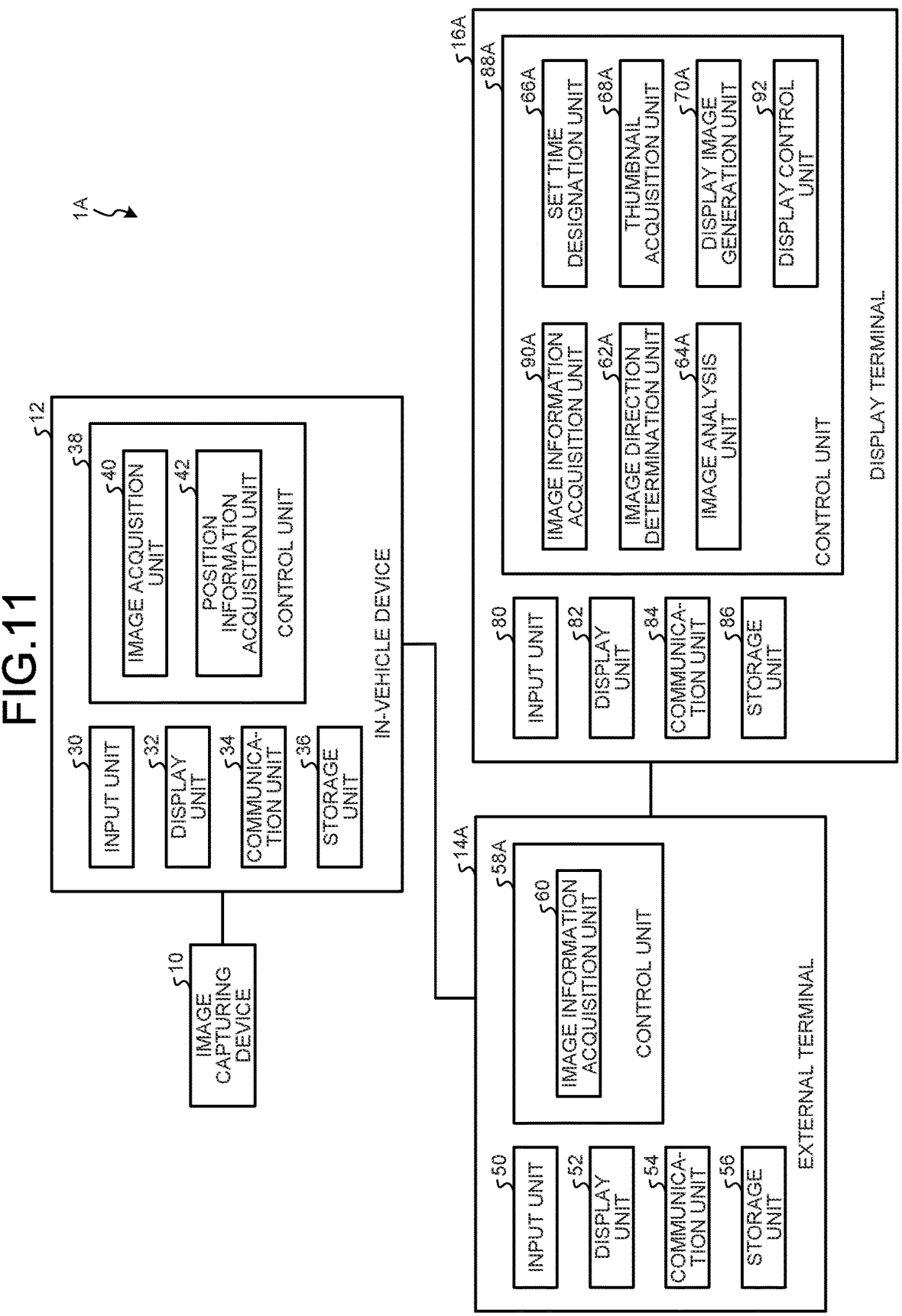

DISPLAY CONTROL DEVICE, DISPLAY CONTROL METHOD, AND PROGRAM

CROSS-REFERENCE TO RELATED APPLICATION

This application is a Continuation of PCT International Application No. PCT/JP2019/028316 filed on Jul. 18, 2019 which claims the benefit of priority from Japanese Patent Application No. 2018-137043 filed on Jul. 20, 2018, the entire contents of both of which are incorporated herein by reference.

BACKGROUND

1. Technical Field

The present disclosure relates to a display control device, a display control method, and a program.

2. Description of the Related Art

For example, there is a device that stores and displays images captured during movement, such as a drive recorder that stores images taken from a vehicle camera. For example, JP 2013-235395 A describes a display control system that displays thumbnail images associated with images recorded on the drive recorder.

Images captured during movement may cause a large amount of data in a case where the images are captured for a long period of time. In such a case, there is concern that it may be difficult to detect a scene required by a viewer. For example, even though thumbnail images are displayed side by side as in JP 2013-235395 A, since the thumbnail images are merely arrayed in a matrix form, there is concern that it may not be possible to distinguish the thumbnail images from each other and detect the required scene. Therefore, there is a need to appropriately detect the scene desired by the viewer from the captured images in the large amount of data.

SUMMARY

It is an object of the present disclosure to at least partially solve the problems in the conventional technology.

A display control device according to an embodiment of the present disclosure includes an image information acquisition unit that acquires information on a plurality of images captured during movement, a set time designation unit that designates a plurality of set times based on the information on images, a thumbnail acquisition unit that acquires the images captured at the set times as thumbnails, and a display image generation unit that generates a display image to be displayed on a display unit so that the plurality of acquired thumbnails are arrayed in a predetermined direction in image-capturing time-series order while being displayed side by side in a direction different from the predetermined direction based on position information indicating positions at which the images are captured.

A display control device according to an embodiment of the present disclosure includes a thumbnail acquisition unit that acquires thumbnails of images that are 360-degree images, and a display image generation unit that generates a display image to be displayed on a display unit so that the acquired thumbnails are displayed on outer circumferential surfaces of spherical display areas in a virtual three-dimensional space displayed on the display unit, while being changed in angle by rotating the display areas.

A non-transitory computer readable recording medium storing therein a program according to an embodiment of the present disclosure causes a computer to execute an image information acquisition step of acquiring information on a plurality of images captured during movement, a set time designation step of designating a plurality of set times based on the information on images, a thumbnail acquisition step of acquiring the images captured at the respective set times as thumbnails, and a display image generation step of generating a display image to be displayed on a display unit so that the plurality of acquired thumbnails are arrayed in a predetermined direction in image-capturing time-series order while being displayed side by side in a direction different from the predetermined direction based on position information indicating positions at which the images are captured.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 3 is a schematic block diagram of a display control system according to the present embodiment;
FIG. 9 is a diagram illustrating another example of a display image;
FIG. 10 is a flowchart illustrating a method of displaying a display image;
and
FIG. 11 is a block diagram illustrating another example of a display control system according to the present embodiment.

DETAILED DESCRIPTION OF THE PREFERRED EMBODIMENTS

Hereinafter, the present embodiment will be described in detail with reference to the drawings. It should be noted that the present disclosure is not limited to the embodiment which will be described below.

Configuration of Display Control System

Figure 1:
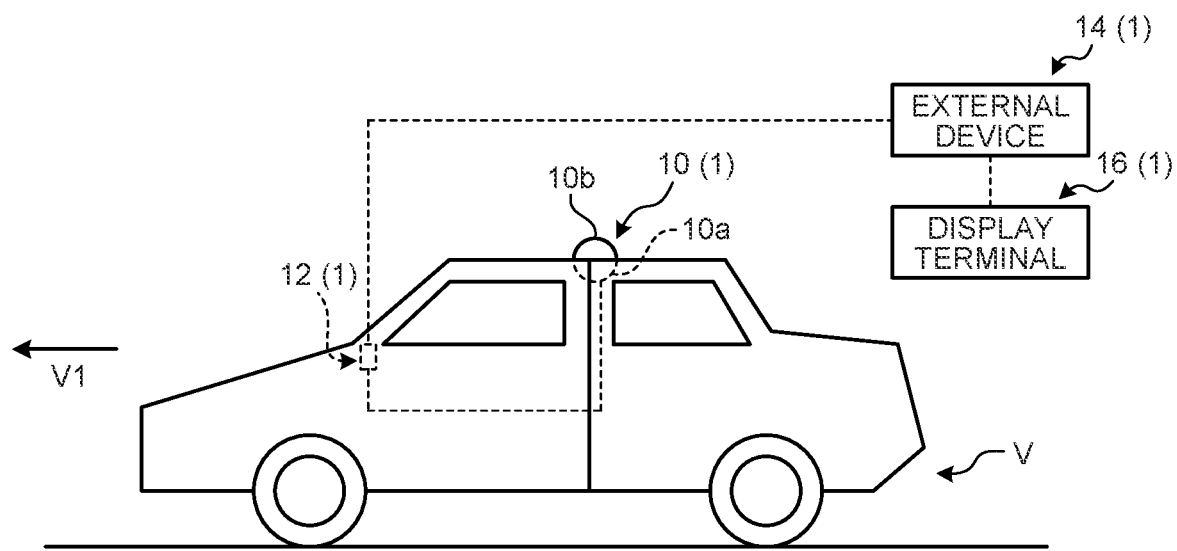
FIG. 1 is a schematic diagram of a vehicle according to the present embodiment.

FIG. 1 is a schematic diagram of a vehicle according to the present embodiment. A display control system 1 according to the present embodiment is a system for controlling the display of images captured by an image capturing device 10. As illustrated in FIG. 1, the display control system 1 includes an image capturing device 10, an in-vehicle device 12, an external device 14, and a display terminal 16.

Figure 2:
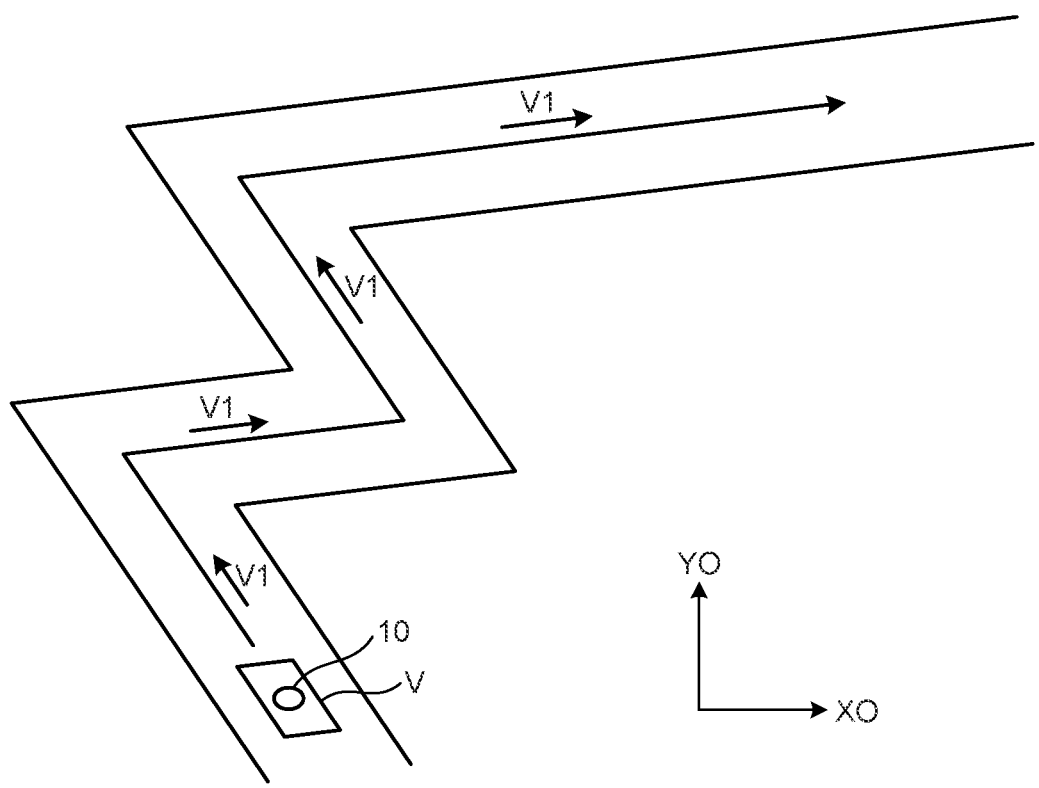
FIG. 2 is a diagram illustrating an example in which a vehicle moves.

FIG. 2 is a diagram illustrating an example in which a vehicle moves. The image capturing device 10 is an image capturing device mounted on a vehicle V to capture images. The image capturing device 10 captures images while moving together with the vehicle V. Thus, it can be said that the image capturing device 10 captures an image for each position while moving, that is, while being changed in position. In FIG. 2, which is a diagram for the example of the moving vehicle V viewed from above in a vertical direction, direction X0 is a horizontal direction in an absolute coordinate, and direction Y0 is a horizontal direction orthogonal to the direction X0 in the absolute coordinate. Here, a moving direction of the vehicle V, i.e. a moving direction of the vehicle V in the absolute coordinate will be referred to as a travelling direction V1. The vehicle V moves while being changed in travelling direction V1. In the example of FIG. 2, the travelling direction V1 is changed from the direction Y0 to the direction X0, changed back to the direction Y0, and then changed to the direction X0. The change in the travelling direction V1 in FIG. 2 is merely an example. It should be noted that the image capturing device 10 is not limited to being mounted on the vehicle V as long as it captures images while moving in the travelling direction V1. For example, the image capturing device 10 may be carried by a user who is walking to capture images while moving as the user is walking.

In addition, the image capturing device 10 consecutively captures images every predetermined frame rate. As the images, moving images (a plurality of consecutive images) are captured. However, the image capturing device 10 is not limited to capturing moving images, and may capture still images every predetermined time interval. The image capturing device 10 according to the present embodiment is a 360-degree camera capturing wide-area images, i.e. 360-degree images. The 360-degree image refers to a 360-degree panoramic image, which is an image captured outwardly in a radial direction of a predetermined axis along a circumferential direction with respect to the predetermined axis for one full turn, i.e. 360 degrees. Further, the 360-degree image may be any one of a full-spherical panoramic image, hemispherical panoramic images, and a 360-degree horizontal panoramic image.

As illustrated in FIG. 1, in the present embodiment, the image capturing device 10 includes lenses 10a and 10b provided opposite to each other to capture respective hemispherical panoramic images. These hemi-spherical panoramic images are synthesized to obtain a full-spherical panoramic image. In the present embodiment, the lenses 10a and 10b are ultra-wide-angle lenses, i.e. fisheye lenses. The lens 10a is installed in the vehicle V to capture a 360-degree image in the vehicle V. The lens 10b is installed outside the vehicle V to capture a 360-degree image around the vehicle V. That is, it can be said that the image capturing device 10 captures images inside and outside the vehicle V. However, the image capturing device 10 is not limited to synthesizing the captured images of the two lenses 10a and 10b to form a full-spherical panoramic image as described above, and may use an image of a single lens to form a 360-degree image.

In addition, the image capturing device 10 is installed on a ceiling of the vehicle V, with the lens 10a being provided inside the vehicle and the lens 10b being provided outside the vehicle. However, the image capturing device 10 is not limited to being installed on the ceiling of the vehicle V, and may be installed at any position of the vehicle V. For example, the image capturing device 10 may be installed on a window of the vehicle V, with the lens 10a being provided toward the inside of the vehicle and the lens 10b being provided toward the outside of the vehicle. That is, the lens 10b is installed to capture an image outside the vehicle from the window of the vehicle V. In addition, in the present embodiment, an installation position of the image capturing device 10 in the vehicle V is predetermined. However, for example, the user may freely set the installation position of the image capturing device 10, and the installation position may be changed whenever the image capturing device 10 is used.

As described above, the image capturing device 10 captures 360-degree images inside and outside the vehicle V. However, the image capturing device 10 is not limited to capturing 360-degree images as long as it captures images while moving, and may capture, for example, images from a normal angle of view. That is, the image capturing device 10 according to the present embodiment is at least either one capturing images while moving or one capturing 360-degree images while moving.

Referring back to FIG. 1, the in-vehicle device 12, which is a device installed in the vehicle V, is a storage device that stores the images captured by the image capturing device 10. That is, the in-vehicle device 12 is a drive recorder. In addition, the external device 14, which is a server installed outside the vehicle V, acquires the images acquired by the in-vehicle device 12, i.e. the images captured by the image capturing device 10. As will be described in detail later, the external device 14 generates a plurality of thumbnails from the images captured by the image capturing device 10 and generates a display image in which the thumbnails are arrayed. The display terminal 16, which is a display device that displays the images acquired by the external device 14, i.e. the images captured by the image capturing device 10, also displays the display image generated by the external device 14.

FIG. 3 is a schematic block diagram of the display control system according to the present embodiment. As described above, the image capturing device 10 illustrated in FIG. 3 captures images inside the vehicle V and around the vehicle V while moving as the vehicle V moves. Hereinafter, the images captured by the image capturing device 10 will be referred to as images P. It can be said that the images P are images captured during movement. It should be noted that the image capturing device 10 may include a microphone, although not illustrated, to record sounds (e.g. sounds in the vehicle V) simultaneously with capturing the images P.

The in-vehicle device 12 includes an input unit 30, a display unit 32, a communication unit 34, a storage unit 36, and a control unit 38. The input unit 30 is a mechanism enabling a user to input information, e.g. a button or a touch panel. The display unit 32 is a display that displays various pieces of information such as images, e.g. a touch panel. In addition, the in-vehicle device 12 may also be configured to output sounds through a speaker, although not illustrated. In this case, the in-vehicle device 12 can reproduce the sounds recorded by the image capturing device 10 through the speaker, while displaying the images P captured by the image capturing device 10 on the display unit 32. In addition, the control unit 38 can activate a map application to acquire a current position of the vehicle V in the absolute coordinate through a global positioning system (GPS), so that the display unit 32 displays navigation information indicating the position of the vehicle V on a map. The in-vehicle device 12 may be a mobile terminal such as a smartphone or a tablet.

The communication unit 34 is configured to communicate with another device, e.g. the image capturing device 10 or the external device 14, under the control of the control unit 38, to transmit and receive data. The storage unit 36 is a memory that stores various pieces of information such as calculation contents of the control unit 38 and the images P. The storage unit 36 includes at least one of, for example, a random access memory (RAM), a read only memory (ROM), and an external storage device such as a flash memory.

The control unit 38 is an arithmetic unit, i.e. a central processing unit (CPU). The control unit 38 includes an image acquisition unit 40 and a position information acquisition unit 42. The image acquisition unit 40 and the position information acquisition unit 42 read software (program) stored in the storage unit 36 to cause the CPU to perform predetermined processes that will be described later.

The image acquisition unit 40 acquires the images P captured by the image capturing device 10 via the communication unit 34. The image acquisition unit 40 causes the storage unit 36 to store the acquired images P in association with image-captured times. The image acquisition unit 40 may also acquire sound data recorded in the image capturing device 10 in addition to the images P.

The position information acquisition unit 42 acquires position information of the vehicle V. The position information acquisition unit 42 acquires a current position of the vehicle V in the absolute coordinate as the position information. The position information acquisition unit 42 acquires the current position of the vehicle V in the absolute coordinate system by communicating with, for example, a satellite via the communication unit 54 as the GPS. The position information acquisition unit 42 can acquire current positions every predetermined time interval, thereby sequentially detecting the positions of the moving vehicle V.

In addition, the position information acquisition unit 42 acquires travelling directions V1 of the vehicle V as the position information. The position information acquisition unit 42 sequentially acquires the travelling directions V1 of the vehicle V based on the current positions of the vehicle V acquired every predetermined time interval. That is, the position information acquisition unit 42 detects in what direction the vehicle V is travelling, that is, what the travelling direction V1 is, from an immediately previous position of the vehicle V and a current position of the vehicle V. The position information acquisition unit 42 causes the storage unit 36 to store the position information, i.e. the current position and the travelling direction V1, in association with a time at which the position information is acquired.

The external device 14 includes an input unit 50, a display unit 52, a communication unit 54, a storage unit 56, and a control unit 58. The external device 14 is a server installed outside the vehicle V, i.e. a computer. The input unit 50 is a mechanism enabling the user to input information, e.g. a button or a touch panel. The display unit 52 is a display that displays various pieces of information such as images. In addition, the external device 14 may also be configured to output sounds through a speaker, although not illustrated. It is only required that, as the server, the external device 14 at least includes the communication unit 54, the storage unit 56, and the control unit 58.

The communication unit 54 is configured to communicate with another device, e.g. the external device 14 or the display terminal 16, under the control of the control unit 58, to transmit and receive data. The storage unit 56 is a memory that stores various pieces of information such as calculation contents of the control unit 58 and the images P. The storage unit 56 includes at least one of, for example, a random access memory (RAM), a read only memory (ROM), and an external storage device such as a flash memory.

The control unit 58 is an arithmetic unit, i.e. a central processing unit (CPU). The control unit 58 includes an image information acquisition unit 60, an image direction determination unit 62, an image analysis unit 64, a set time designation unit 66, a thumbnail acquisition unit 68, and a display image generation unit 70. The image information acquisition unit 60, the image direction determination unit 62, the image analysis unit 64, the set time designation unit 66, the thumbnail acquisition unit 68, and the display image generation unit 70 read software (program) stored in the storage unit 56 to cause the CPU to perform predetermined processes that will be described later.

The image information acquisition unit 60 acquires information on images P. In the present embodiment, the image information acquisition unit 60 acquires the images P and the position information as the information on images P from the in-vehicle device 12. The image information acquisition unit 60 causes the storage unit 56 to store the acquired images P and position information. After the image capturing device 10 completes the capturing of the images P, the image information acquisition unit 60 acquires the images P and the position information to be stored in the storage unit 56. That is, the image information acquisition unit 60 acquires all data on the images P at once. However, for example, when the images P are consecutively captured as moving images, the images P may be divided into a plurality of moving image data. In this case, the image information acquisition unit 60 may acquire moving image data every time the moving image data is generated, rather than acquiring all data on the images P at once. In addition, the image information acquisition unit 60 may also acquire the sound data recorded in the image capturing device 10 as the information on images P to be stored in the storage unit 56.

The image direction determination unit 62 determines (calculates) which direction in the absolute coordinate a direction in the image P is, based on the images P and the position information. The direction in the image P is a direction in a camera coordinate system of the image capturing device 10, referring to a direction such as an upward direction, a downward direction, a rightward direction, or a leftward direction in the image P. Hereinafter, how to associate the directions in the image P with the directions in the absolute coordinate will be described.

In the present embodiment, the image capturing device 10 is installed on the vehicle V at a predetermined position and posture. Accordingly, the posture of the image capturing device 10, i.e. an image capture direction (a direction that a camera angle and a lens face) is fixed with respect to the vehicle V. In other words, since the posture of the image capturing device 10 with respect to the vehicle V is preset, the image direction determination unit 62 can acquire information on the posture of the image capturing device 10 with respect to the vehicle V by acquiring a value set for the posture of the image capturing device 10 with respect to the vehicle V. Through the information on the posture of the image capturing device 10 with respect to the vehicle V, the direction in the image P can be associated with the direction of the vehicle V. In addition, the image direction determination unit 62 acquires a travelling direction V1 of the vehicle V as the position information. Since the travelling direction V1 of the vehicle V is a direction in the absolute coordinate for the direction of the vehicle V (the front of the vehicle V), the direction of the vehicle V can be associated with the direction in the absolute coordinate. In this way, the direction in the image P can be associated with the direction in the absolute coordinate through the information obtained by associating the direction of the vehicle V with the direction in the image P and the information obtained by associating the direction of the vehicle V with the direction in the absolute coordinate. That is, the image direction determination unit 62 can calculate the posture of the image capturing device 10 in the absolute coordinate, based on the acquired information on the value set for the posture of the image capturing device 10 with respect to the vehicle V and the direction of the vehicle V in the absolute coordinate. In other words, the image direction determination unit 62 can associate the direction in the image P with the direction in the absolute coordinate, based on the information on the posture of the image capturing device 10 with respect to the vehicle V and the information on the direction of the vehicle V in the absolute coordinate. In addition, the image direction determination unit 62 can associate the direction of the image P in the image and the travelling direction V1 of the vehicle V by associating the direction of the image P in the image with the direction in the absolute coordinate. In this way, the image direction determination unit 62 can set the direction in the absolute coordinate or the travelling direction V1 in the image P.

It has been described above that the image direction determination unit 62 acquires the information on the posture of the image capturing device 10 with respect to the vehicle V by acquiring the predetermined set value. However, the image direction determination unit 62 is not limited to acquiring the information on the posture of the image capturing device 10 with respect to the vehicle V based on the set value. For example, although not illustrated, an acceleration sensor may be installed in the image capturing device 10, so that the image direction determination unit 62 acquires information on the posture of the image capturing device 10 with respect to the vehicle V based on a detection value of the acceleration sensor, i.e. an acceleration of the image capturing device 10. Since the image capturing device 10 has an acceleration generated along the travelling direction V1, the image direction determination unit 62 can acquire the information on the posture of the image capturing device 10 with respect to the vehicle V by associating the travelling direction V1 with the posture of the image capturing device 10 from the acceleration of the image capturing device 10. In addition, for example, a gyro sensor capable of detecting a posture of the image capturing device 10 in the absolute coordinate may be installed in the image capturing device 10, so that the image direction determination unit 62 acquires a detection value of the gyro sensor as the information on the posture of the image capturing device 10 with respect to the vehicle V. By detecting the direction or the like of the image capturing device 10 using the sensor as described above, even when the installation position of the image capturing device 10 is not fixed, the image direction determination unit 62 can acquire the information on the posture of the image capturing device 10 with respect to the vehicle V and calculate the posture of the image capturing device 10 in the absolute coordinate. In this way, the image direction determination unit 62 may associate the direction of the image P in the image with the direction in the absolute coordinate and the travelling direction V1 using any method.

The image analysis unit 64, which analyzes the information on images P acquired by the image information acquisition unit 60, extracts feature images from the plurality of images P and detects times at which the feature images are captured as feature times (feature tags). In other words, it can be said that the feature images are images P captured at the feature times. The image analysis unit 64 determines images P satisfying predetermined conditions among the plurality of images P (moving images captured by the image capturing device 10 every frame in the present embodiment) as the feature images. The feature image is an image captured for a scene that is assumed to be highly likely to be desired by a user to view, and the image analysis unit 64 extracts the feature image based on the predetermined condition.

The image analysis unit 64 detects the feature time by determining whether the image P satisfies the predetermined condition, that is, by determining whether a parameter extracted from the image P satisfies the predetermined condition. For example, when a facial expression of a person captured in the image P as the parameter is an expression satisfying a predetermined feature amount, e.g. a smile, the image analysis unit 64 determines the image P as the feature image and detects a time at which the image P is captured as the feature time. In addition, the image analysis unit 64 may extract an image P in which a preset person is captured as the feature image, based on a feature amount of a face or the like, with the person captured in the image P being a parameter. In addition, the image analysis unit 64 may detect the feature time by determining whether the sound (e.g., the sound in the vehicle) recorded in the image capturing device 10 satisfies a predetermined condition, that is, by determining whether a parameter extracted from the sound satisfies the predetermined condition. For example, when a sound parameter, e.g. a volume or a frequency, is beyond a predetermined range, for example greater than a predetermined threshold value, the image analysis unit 64 determines an image P captured at a time when the sound is recorded as a feature image, and detects the time at which the image P is captured (i.e. the time at which the sound is recorded) as the feature time. In addition, for example, when a predetermined keyword is included in the sound, the image analysis unit 64 may determine an image P captured at a time when the sound is recorded as a feature image. In addition, the image analysis unit 64 may detect the feature time by determining whether the position information satisfies a predetermined condition, that is, by determining whether a parameter extracted from the position information satisfies the predetermined condition. For example, the image analysis unit 64 detects whether the vehicle V is positioned at a predetermined place, with the position of the vehicle V being a parameter, determines an image P captured at a time when the vehicle V is positioned at (reaches) the predetermined place as a feature image, and detect the time at which the image P is captured (i.e. the time at which the vehicle V reaches the predetermined place) as a feature time. Here, the predetermined place may be set by the user or may be set by the control unit 58. The predetermined place can be set to any of, for example, an intermediate point or a branch point in a moving route of the vehicle V, a tourist attraction, and the like.

The image analysis unit 64 may use any one of the above-described feature image determination methods, or may combine multiple ones of the above-described feature image determination methods. That is, the image analysis unit 64 may determine whether an image is a feature image using at least one of the image P, the sound, and the position information, or may determine whether an image is a feature image using all of the image P, the sound, and the position information. In addition, when there are a plurality of parameters for determining a feature image, the image analysis unit 64 may score the plurality of parameters to weight the plurality of parameters in determining the feature image. For example, the image analysis unit 64 may count the number of parameters satisfying predetermined conditions, and determine an image P at a time when the number becomes a predetermined value or more as a feature image. For example, in a case where the predetermined number is two, if there is a time at which the facial expression of the person is a smile and also the sound has a threshold value or more, an image P at that time is determined as a feature image because two parameters satisfy the predetermined conditions. In addition, with regard to one parameter, predetermined conditions, i.e. threshold values, may be set in a plural number in a stepwise manner, and a point may be set for each threshold value. In this case, the image analysis unit 64 determines, for example, an image P at a time when a sum of the points becomes a predetermined value or more as a feature image. In addition, when a plurality of feature images are extracted, the feature images may be ranked based on the number of parameters satisfying the predetermined conditions or the sum of the points, that is, by score. That is, the image P is an image that is presumed to be more likely to be desired by the user to view as the score is higher. The score is, for example, the number of parameters satisfying the predetermined conditions or the sum of the points.

Figure 4A:
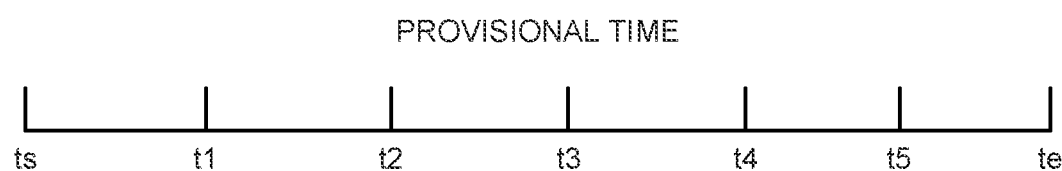
FIG. 4A is a diagram for explaining set times.
Figure 4B:
FIG. 4B is a diagram for explaining set times.
Figure 4C:
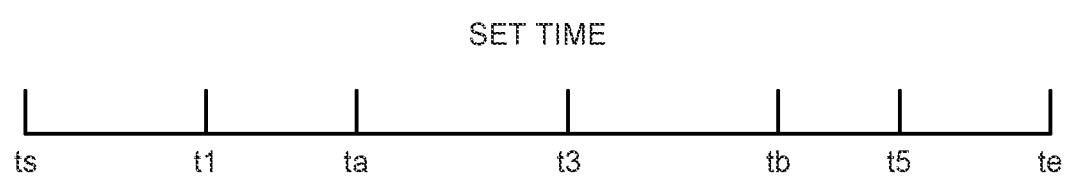
FIG. 4C is a diagram for explaining set times.

FIGS. 4A to 4C are diagrams for explaining set times. Based on the information on images P, the set time designation unit 66 designates a plurality of set times different from each other within a period of time during which the images P are captured. The thumbnail acquisition unit 68, which will be described later, acquires images P captured at the set times as thumbnails 100. An example of setting the set times will be described with reference to FIGS. 4A to 4C. In FIGS. 4A to 4C, a horizontal axis represents time. In the example of FIGS. 4A to 4C, a period of time (an image capturing period of time) during which the images P are captured is from time ts to time te. That is, the capturing of the images P is started at the time ts, and the capturing of the images P is terminated at the time te.

As illustrated in FIG. 4A, the set time designation unit 66 sets a plurality of provisional times (provisional tags) every predetermined time interval between the time ts and the time te. The predetermined time interval, i.e. a duration between the provisional times, has a predetermined regular length, e.g. 5 minutes or more and 10 minutes or less. That is, the set time designation unit 66 sets the provisional times every regular time interval within the period of time during which the images are captured. In the example of FIGS. 4A to 4C, the provisional times are t1, t2, t3, t4, and t5, and a duration from t1 to t2, a duration from t2 to t3, a duration from t3 to t4, and a duration from t4 to t5 are identical to each other in length.

In addition, the set time designation unit 66 acquires the feature times detected by the image analysis unit 64, i.e. the times at which the feature images are captured. In the example of FIGS. 4A to 4 C, as illustrated in FIG. 4B, the time ta and the time tb are detected as feature times within the period during which the images P are captured.

The set time designation unit 66 designates set times based on the feature times, i.e. the times at which the feature images are captured. More specifically, in the present embodiment, the set time designation unit 66 designates the set times based on the provisional times and the feature times. As illustrated in FIG. 4C, the set time designation unit 66 sets the provisional times and the feature times as the set times. Further, the set time designation unit 66 replaces provisional times closest to the feature times, among the plurality of provisional times, with the feature times, and sets the replacement feature times as the set times. Also, the set time designation unit 66 designates provisional times that are not replaced with the feature times, i.e. provisional times other than the provisional times closest to the feature times, as the set time. That is, in the example of FIGS. 4A to 4C, a provisional time closest to the time ta, which is a feature time, is the time t2, and a provisional time closest to the time tb, which is another feature time, is the time t4. Thus, the times t2 and t4 are replaced with the feature times ta and tb, and the times ta and tb are set as the set times. In addition, the other provisional times t1, t3, and t5 are set as the set times. That is, in the example of FIGS. 4A to 4C, the times t1, ta, t3, tb, and t5 are designated as the set times.

When the provisional times are used as the set times as they are, the durations between the set times are regular. However, when the set times are designated based on the feature times as described above, lengths between the set times, that is, between the set times that are continuous on the time-series basis, are different from each other for each set time. That is, a duration between the time t1 and the time ta, a duration between the time ta and the time t3, a duration between the time t3 and the time tb, and a duration between the time tb and the time t5 are different from each other. However, the durations between the set times are not limited to all being different from each other, and it is only required that at least one of the durations between the set times be different from the others. That is, a duration between a set time set based on the feature time and a set time that is continuous therefrom on the time-series basis is different from a duration between at least one and another one of the other set times.

It should be noted that, although it has been described above that the set time designation unit 66 sets the feature time as the set time, the feature time may not be set as the set time as it is as long as the set time is set based on the feature time. That is, the set time designation unit 66 may set a time deviated by a predetermined duration from the feature time as the set time. For example, the set time designation unit 66 may set a time earlier by a predetermined duration than the feature time as the set time. By setting the set time in this way, the images reproduced from the set time can include images before or after the feature image.

The set time designation unit 66 according to the present embodiment sets the set times based on the provisional times and the feature times as described above, but is not limited to setting the set times based on the provisional times and the feature times. The set time designation unit 66 may set the set times based on the feature times without using the provisional times. In addition, the set time designation unit 66 may set the set times based on the provisional times without using the feature times. That is, the set time designation unit 66 may set the set times so that the lengths between the set times are regular. In addition, the set time designation unit 66 may set the set times so that the lengths between the set times are different from each other even when the feature times are not used. That is, it is only required that the set time designation unit 66 set a plurality of set times within the period of time during which the images P are captured, that is, between the time ts and the time te. Thus, the set time designation unit 66 is capable of setting set times if there is information on a length of the period of time during which the images P are captured (i.e. the period of time from the time ts to the time te). Therefore, it can be said that the set time designation unit 66 sets the set times based on the information on images P (here, the information on the length of the period of time during which the images P are captured).

Referring back to FIG. 3, the thumbnail acquisition unit 68 acquires images P captured at the set times as thumbnails 100. The thumbnails refer to reduced-size data of images P, the images P captured by the image capturing device 10 at the set times in the present embodiment. In the present embodiment, the thumbnail acquisition unit 68 extracts the images P captured at the set times as the thumbnails 100 from the images P acquired by the image information acquisition unit 60 and stored in the storage unit 56. Since the thumbnail acquisition unit 68 acquires the thumbnails 100 every set time, the thumbnails 100 are acquired as many as the number of set times. It should be noted that the thumbnail acquisition unit 68 may acquire data on the images P captured at the set times as the thumbnails 100 after adding a size reducing process or the like with respect thereto, or acquire data on the images P captured at the set times as the thumbnails 100 as it is without adding any process with respect thereto. In addition, the thumbnail 100 is a still image at the set time in the present embodiment, but may be, for example, moving images captured for a predetermined period of time from the set time.

The display image generation unit 70 generates an image including the thumbnails 100 acquired by the thumbnail acquisition unit 68 as a display image P1. In the present embodiment, the display image generation unit 70 transmits the generated display image P1 to the display terminal 16, so that the transmitted display image P1 is displayed on a display unit 82 of the display terminal 16, which will be described later. However, the display image P1 generated by the display image generation unit 70 may be displayed on another display unit (e.g. the display unit 32 of the in-vehicle device 12 or the display unit 52 of the external device 14) of the display control system 1. The display image P1 will be described later.

As described above, in the present embodiment, the external device 14 acquires the information on images P through the image information acquisition unit 60, designates the set times through the set time designation unit 66, acquires the thumbnails 100 through the thumbnail acquisition unit 68, and generates the display image P1 through the display image generation unit 70. Thus, in the present embodiment, the external device 14 constitutes a display control device.

As illustrated in FIG. 3, the display terminal 16 includes an input unit 80, a display unit 82, a communication unit 84, a storage unit 86, and a control unit 88. The display terminal 16 is a device for displaying the display image P1, e.g. a mobile terminal carried by a user such as a tablet or a smartphone in the present embodiment. Therefore, the display terminal 16 may be brought into the vehicle V by the user. However, the display terminal 16 may be any device as long as it displays the display image P1. The in-vehicle device 12 and the display terminal 16 may be different mobile terminals or may be the identical mobile terminal.

The input unit 80 is a mechanism enabling the user to input information, e.g. a button or a touch panel. The display unit 82 is a display that displays various pieces of information such as images, e.g. a touch panel. In addition, the display terminal 16 may also be configured to output sounds through a speaker, although not illustrated. In this case, the display terminal 16 may reproduce the sounds recorded by the image capturing device 10 through the speaker while displaying the images P captured by the image capturing device 10 on the display unit 82.

The communication unit 84 is configured to communicate with another device, e.g. the external device 14, under the control of the control unit 88, to transmit and receive data.

The storage unit 86 is a memory that stores various pieces of information such as calculation contents of the control unit 88 and the images P. The storage unit 86 includes at least one of, for example, a random access memory (RAM), a read only memory (ROM), and an external storage device such as a flash memory.

The control unit 88 is an arithmetic unit, i.e. a central processing unit (CPU). The control unit 88 includes a display image acquisition unit 90 and a display control unit 92. The display image acquisition unit 90 and the display control unit 92 read software (program) stored in the storage unit 86 to cause the CPU to perform predetermined processes that will be described later.

The display image acquisition unit 90 acquires an image to be displayed on the display unit 82. The display image acquisition unit 90 acquires a display image P1 generated by the display image generation unit 70 as the image to be displayed on the display unit 82 from the external device 14. In addition, the display image acquisition unit 90 acquires the images P captured by the image capturing device 10 as images to be displayed on the display unit 82 from the external device 14. The display control unit 92 causes the display unit 82 to display the images acquired by the display image acquisition unit 90.

Concerning Display Image

Figure 5:
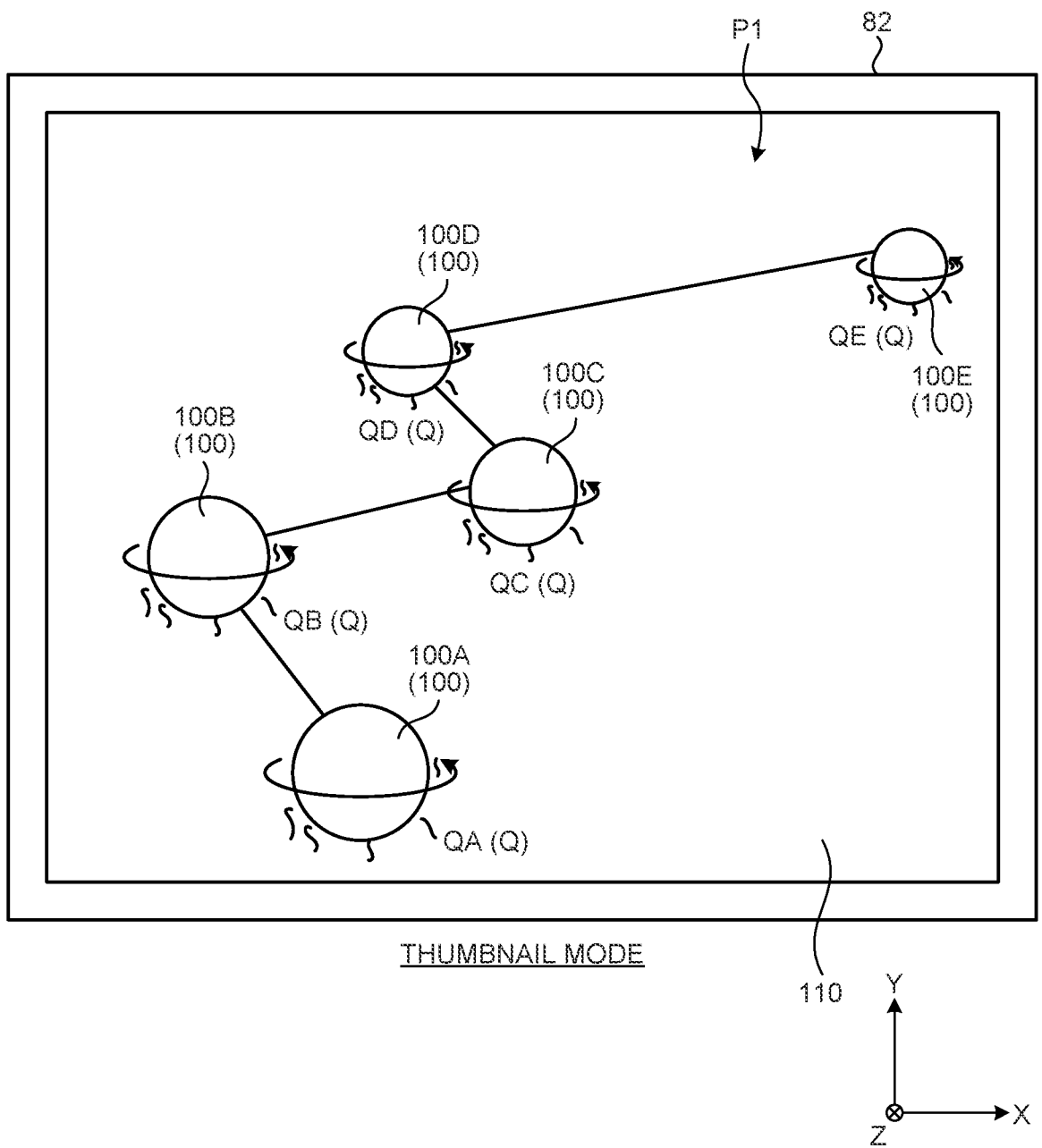
FIG. 5 is a diagram illustrating an example of a display image.

Hereinafter, the display image P1 generated by the display image generation unit 70 of the external device 14 will be described. FIG. 5 is a diagram illustrating an example of a display image. FIG. 5 illustrates an example in which the display image P1 is displayed on a display screen of the display unit 82. In addition, in the example of FIG. 5, it is illustrated that the display image P1 is displayed in a thumbnail mode, i.e. a mode in which display areas Q, which will be described later, are displayed while being rotated. As illustrated in FIG. 5, the display image generation unit 70 generates the display image P1 so that the thumbnails 100 acquired by the thumbnail acquisition unit 68 are displayed side by side in image-capturing time-series order. In the display terminal 16, the display image P1 generated by the display image generation unit 70 is acquired through the display image acquisition unit 90, and the acquired display image P1 is displayed on the display screen of the display unit 82 by the display control unit 92.

Here, the thumbnails 100 are generated on a time-series basis, that is, every set time. The display image generation unit 70 generates an image in which the thumbnails 100 are arrayed in image-capturing time-series order (every time-series set time) as the display image P1. In the example of FIG. 5, thumbnails 100A, 100B, 100C, 100D, and 100E are displayed as the thumbnails 100. The thumbnails 100A, 100B, 100C, 100D, and 100E are images captured in this order on the time-series basis. That is, the thumbnail 100A is an image captured at the time t1 illustrated in FIGS. 4A to 4C, the thumbnail 100B is an image captured at the time to illustrated in FIGS. 4A to 4C, the thumbnail 100C is an image captured at the time t3 illustrated in FIGS. 4A to 4C, the thumbnail 100D is an image captured at the time tb illustrated in FIGS. 4A to 4C, and the thumbnail 100E is an image captured at the time t5 illustrated in FIGS. 4A to 4C. Thus, in FIG. 5, the thumbnails 100A, 100B, 100C, 100D, and 100E are arrayed in this order.

The display image P1 will be described in more detail. Hereinafter, the display image P1 will be described based on direction X, direction Y, and direction Z. The direction X is a direction along the display screen in the display image P1, and the direction Y is a direction orthogonal to the direction X along the display screen in the display image P1. In addition, the direction Z is a direction orthogonal to the direction X and the direction Y, and is a depth direction of the display screen. That is, the directions X, Y, and Z are respective directions in the coordinate set on the display screen. The display image generation unit 70 reproduces a virtual three-dimensional space having directions X, Y, and Z as three axes on the display screen, and reproduces a display image P1 in the virtual three-dimensional space. The display image generation unit 70 arranges a plurality of spherical display areas Q in the virtual three-dimensional space, that is, in the display image P1. In addition, the display image generation unit 70 maps the thumbnails 100 onto outer surfaces of the spherical display areas Q to display the thumbnails 100 on the outer surfaces of the display areas Q. In the present embodiment, since the image P, i.e. the thumbnail 100, is a 360-degree image, the thumbnail 100 is mapped throughout the entire circumference of the display area Q in the circumferential direction thereof. However, in the present embodiment, since the display screen has a two-dimensional surface along the directions X and Y, the display image P1 actually displayed on the display area Q is an image mapped on a surface of the display area Q on an opposite side of the direction Z (close to the front side of the display screen) of the entire thumbnail 100. While the display area Q is in a shape of a sphere, the sphere may be a sphere having a constant distance from the center to an outer circumferential surface thereof or an ellipsoid having a non-constant distance from the center to an outer circumferential surface thereof. That is, it can here be said that the shape of the sphere is a shape in which the outer circumferential surface is curved and continuous (not discontinuous).

Furthermore, the display image generation unit 70 generates the display image P1 in such a manner as to rotate each of the display areas Q in the thumbnail mode illustrated in FIG. 5. The thumbnail 100 is displayed while being changed in angle according to the rotation of the display area Q, and thus, a displayed image (a displayed image area of the entire thumbnail 100) is changed. In other words, it can be said that the display image generation unit 70 displays the thumbnail 100 while virtually changing a camera angle (an image capture direction) of the image capturing device 10 by rotating the display area Q. Further, a partial image of the entire thumbnail 100 is displayed, and a displayed portion is changed according to the rotation of the display area Q. An image of the thumbnail 100 is displayed from different angles as the display area Q rotates, so that, for example, an image from 0 degrees to 180 degrees of the 360-degree image is displayed at a certain time, and an image from 1 degree to 181 degrees is displayed at a next time. As described above, the image P, i.e. the thumbnail 100, is an image for one full turn along the circumferential direction with respect to the predetermined axis. A rotation direction of the display area Q may be, for example, a direction along the circumferential direction with respect to the predetermined axis. However, since the display area Q is spherical, the thumbnail 100 can be appropriately displayed regardless of what direction the display area Q rotates in. Therefore, it is preferable that the display image generation unit 70 randomly rotates the display area Q in any direction. That is, the display image generation unit 70 may change the rotation direction of the display area Q. In addition, the display image generation unit 70 may rotate the display areas Q in the same direction or may rotate the display areas Q in different directions. In addition, the display image generation unit 70 may change a rotation speed of the display area Q. In addition, the display image generation unit 70 may rotate the display areas Q at the same speed or may rotate the display areas Q at different speeds.

In addition, in the thumbnail mode illustrated in FIG. 5, the display image generation unit 70 moves each of the display areas Q in at least one of the direction X, the direction Y, and the direction Z along a predetermined trajectory. As a result, the display area Q, i.e. the thumbnail 100, is visually recognized as floating on the display screen. It is preferable that the trajectory for moving the display area Q is randomly set. In addition, the display image generation unit 70 may set the display areas Q to have the same trajectory or may set the display areas Q to have different trajectories. The display areas Q may have different trajectories. It is preferable that the display area Q has a trajectory set to move in all of the direction X, the direction Y, and the direction Z. By setting the trajectory in this way, it is more likely to visually recognize the display area Q as floating. The trajectory is not limited to being set in a direction along an axis of each of the direction X, the direction Y, and the direction Z, and may be set in any direction. The trajectory is also not limited to being set in a straight line, and may be set in any curved line. Along the predetermined trajectory, the display area Q may move at a constant speed, or may move while being changed in speed.

In this way, the display image generation unit 70 may set the display areas Q to be different from each other in at least one of the rotation direction, the rotation speed, and the movement trajectory. In this case, it can be said that the display image generation unit 70 displays the display areas Q in different manners. In addition, the display image generation unit 70 may display the display areas Q in the same manner.

In addition, the display image generation unit 70 generates the display image P1 so that the display areas Q, i.e. the thumbnails 100, are arrayed in time-series order every time the image of the thumbnail 100 displayed on the display area Q is captured (set time). More specifically, the display image generation unit 70 generates the display image P1 so that the display areas Q (thumbnails 100) are arrayed in the time-series order along the direction Z, i.e. the depth direction of the screen. That is, the display image generation unit 70 arranges the display areas Q (thumbnails 100) such that a display area Q having an image captured at a later time is arrayed closer to the direction Z (on a deeper side of the screen). In the example of FIG. 5, the thumbnail 100A is displayed on an outer surface of a display area QA, the thumbnail 100B is displayed on an outer surface of a display area QB, the thumbnail 100C is displayed on an outer surface of a display area QC, the thumbnail 100D is displayed on an outer surface of a display area QD, and the thumbnail 100E is displayed on an outer surface of a display area QE. In this case, as illustrated in FIG. 5, the display area QA, the display area QB, the display area QC, the display area QD, and the display area QE are arrayed closer to the direction Z in this order, that is, toward a deeper side of the screen. It can be said that, since the display screen is two-dimensional, the display image generation unit 70 decreases a size of a sphere in the order of the display areas QA, QB, QC, QD, and QE, and a size of a later display area Q, i.e. a size of a later thumbnail 100, on the time-series basis is smaller. It should be noted that the direction in which the display areas Q are arrayed on the time-series basis is not limited to the direction Z, and may be any direction. That is, it is only required that the display image generation unit 70 generate the display image P1 so that the display areas Q are displayed side by side in a predetermined direction in the time-series order in which the images of the thumbnails 100 are captured.

In addition, the display image generation unit 70 arranges the thumbnails 100, i.e. the display areas Q, in a direction different from the time-series array direction (here, the direction Z), based on the positions at which the images P as the thumbnails 100 are captured. Here, this will be described based on an image of a first thumbnail (here, thumbnail 100A) captured at a first set time (e.g. time t1 in FIGS. 4A to 4C) and an image of a second thumbnail (here, thumbnail 100B) captured at a second set time (here, time ta) that is later than the first set time. The display image generation unit 70 acquires information on the travelling directions V1 of the vehicle V as the position information. The display image generation unit arranges the first thumbnail and the second thumbnail so that the second thumbnail (thumbnail 100B) is positioned in a travelling direction V1 from the first set time to the second set time with respect to the first thumbnail (thumbnail 100A). In the example of FIG. 5, since the travelling direction V1 from the first set time to the second set time is direction Y (direction Y0 in FIG. 2), the second thumbnail (thumbnail 100B) is positioned on a Y-direction side with respect to the first thumbnail (thumbnail 100A). More specifically, the display image generation unit 70 matches a direction in the absolute coordinate with a direction on the screen. That is, the display image generation unit 70 matches the direction X0 in the absolute coordinate illustrated in FIG. 2 with the direction X on the display screen, and matches the direction Y0 illustrated in FIG. 2 with the direction Y on the screen. This makes it possible to reproduce the travelling directions V1 on the display screen. The display image generation unit 70 sets travelling directions V1 every set time in the display image P1, and arranges the thumbnails 100, i.e. the display areas Q, along the set travelling directions V1.

In addition, the display image generation unit 70 generates the display image P1 so that a background image 110 is displayed in a region excluding the thumbnails 100. That is, the display image P1 is an image in which the thumbnails 100 are displayed over the background image 110. The background image 110 may be any image, but may be, for example, a map image for an area in which the vehicle A travels. In this case, it is preferable that the display image generation unit 70 acquires information on the position of the vehicle V at the time when the image of the thumbnail 100 is captured, and displays the thumbnail 100 (display area Q) at a position of the vehicle V at the time when the image of the thumbnail 100 is captured on the map of the background image 110. By displaying the thumbnail 100 at the position where the image of the thumbnail 100 is captured on the map as described above, it is possible to appropriately recognize what position the image is captured at. In addition, for example, the background image 110 may be an image linked to the time at which the image of the thumbnail 100 is captured. In this case, for example, the background image 110 is a night image when the image of the thumbnail 100 is captured at night, and the background image 110 is a daytime image when the image of the thumbnail 100 is captured at daytime.

In addition, for example, the display image generation unit 70 may change the number of thumbnails 100 to be displayed. In this case, for example, the user performs control (setting) for changing a time interval between the set times, which are the times when the images of the thumbnails 100 are captured, such that the display image generation unit 70 changes the number of thumbnails 100. That is, when the control is performed to decrease the time interval between the set times, the display image generation unit 70 acquires that information, and updates the display image P1 by increasing the number of thumbnails 100 to decrease the time interval between the set times of the thumbnails 100. In addition, when the control is performed to increase the time interval between the set times, the display image generation unit 70 updates the display image P1 by decreasing the number of thumbnails 100 to increase the time interval between the set times of the thumbnails 100.

In addition, all the created thumbnails 100 are displayed on a single screen in the example of FIG. 5, but the display image P1 may be switched to display thumbnails 100 that have not been displayed, for example, by a user's control (such as a screen swiping control), while some of the thumbnails 100 are displayed on the single screen.

Figure 6:
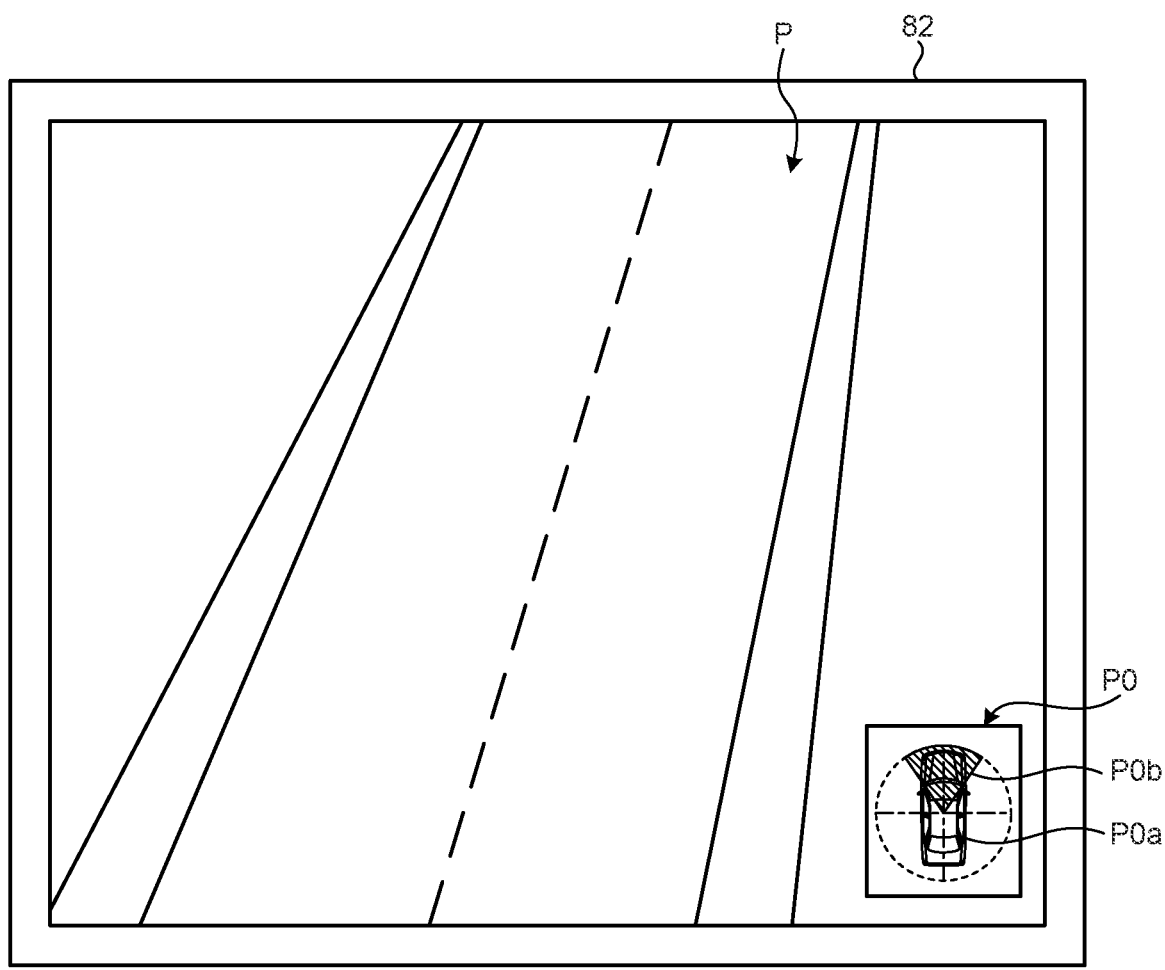
FIG. 6 is a diagram illustrating an example of an image in a display image mode.

FIG. 6 is a diagram illustrating an example of an image in a display image mode. When a thumbnail 100 is selected by the user in a state where the display image P1 is displayed on the display screen (display unit 82), the display control unit 92 of the display terminal 16 switches the image displayed on the display screen from the thumbnail mode, i.e. the display image P1, to an image reproduction mode, i.e. an image P illustrated in FIG. 6. In other words, when the thumbnail 100 is selected by the user, the display terminal 16 acquires the images P from the external device 14 through the display image acquisition unit 90, and the acquired display image P1 is displayed on the display screen of the display unit 82 by the display control unit 92. In this case, the display terminal 16 may perform streaming playback while sequentially acquiring the images P from the external device 14. In addition, the display terminal 16 may acquire all data on the images P from the external device 14, store the acquired data in the storage unit 86, and read and reproduce the images P stored in the storage unit 86. It should be noted that the display control unit 92 of the display terminal 16 may display an image P0 showing an image capture direction (a direction that a camera angle and a lens face) in the display image P1 on the display screen of the display unit 82. FIG. 6 illustrates an example of an image P in which the travelling direction of the vehicle V is captured. Here, a road is captured in the travelling direction of the vehicle V. Thus, in the example of FIG. 6, the image P0 indicates that the travelling direction of the vehicle V is captured in the image P1. For example, the image P0 is a superimposition of an image P0a, which is an icon of the vehicle V, and an image P0b, which is an image indicating an image capture direction in the image P1. It can be said that the image P0a is a schematic image of the vehicle V viewed from above in the vertical direction. The image P0b is, for example, an image showing an image capture range (an oblique-line area in the example of FIG. 6) in a 360-degree area with a central axis being an axis along the vertical direction on the image P0a (a broken-line circular area in the example of FIG. 6). It can be said that the direction of the image showing the image capture range in the image P0b indicates an image capture direction. When the image capture direction in the image P1 is changed by a swiping control or the like, it is preferable that the display control unit 92 changes, for example, the direction of the image P0b, i.e. the direction of the image showing the image capture range, to thereby change the image capture direction indicated by the image P0 as well.

More specifically, when a thumbnail 100 is selected within the display screen, the display control unit 92 reproduces the images P from the time when the image of the thumbnail 100 is captured on the display screen. That is, the display control unit 92 continuously reproduces the images P from the time when the image of the selected thumbnail 100 is captured. This enables the user to cue and reproduce the images P through the thumbnail 100. It should be noted that it is preferable that the display image generation unit 70 generates the display image P1 so that when the thumbnail 100 is selected by the user, switching is performed to reproduce the images P after the display area Q, on which the thumbnail 100 is mapped, is displayed as popping and cracking. However, the screen switching method is not limited thereto, and is arbitrary. For example, the display image P1 may be generated so that switching is performed to reproduce the images P after the display control unit 92 performs displaying the thumbnail 100 selected by the user as enlarging or expanding to spread all over the screen or performs displaying the thumbnail 100 selected by the user as jumping toward the opposite side of the direction Z (close to the front side of the screen). It should be noted that the user may select the thumbnail 100, for example, by touching a portion at which the thumbnail 100 (display area Q) is displayed, or select the thumbnail 100 by controlling a button or the like. That is, the thumbnail 100 is selected in an arbitrary way.

Figure 7:
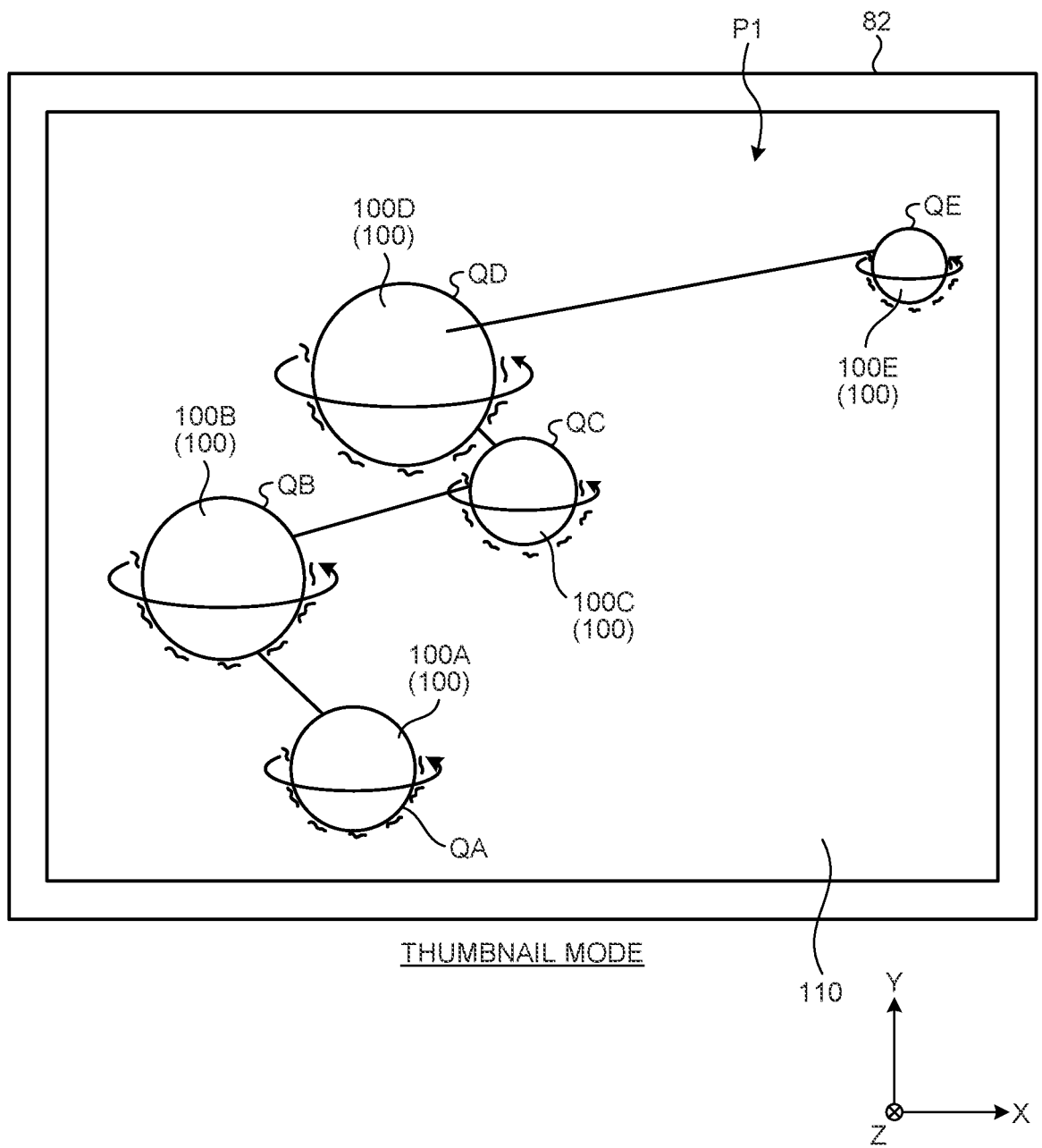
FIG. 7 is a diagram illustrating another example of a display image.

FIG. 7 is a diagram illustrating another example of a display image. Here, the thumbnails 100 extracted as the feature images, i.e. the display areas Q on which the thumbnails 100 at the set times set based on the feature times are mapped, will be described as feature display areas. In addition, the thumbnails 100 that are not extracted as the feature images, i.e. the display areas Q on which the thumbnails 100 at the set times that are not set based on the feature times (here, that are set based on the provisional times) are mapped, will be described as normal display areas. In this case, as illustrated in FIG. 7, the display image generation unit 70 may display the thumbnails 100 mapped on the feature display areas, i.e. the feature images, with emphasis by differentiating a way of displaying the feature display areas from a way of displaying the normal display areas in the thumbnail mode. In the example of FIG. 7, display areas QB and QD are feature display areas, and display areas QA, QC, and QE are normal display areas. In the example of FIG. 7, the display image generation unit 70 displays the display areas QB and QD to be larger than the display areas QA, QC, and QE by displaying the display areas QB and QD on an opposite side to the direction Z (closer to the front side of the screen) with respect to the display areas QA, QC, and QE. That is, in this case, the display areas QB and QD, which are feature display areas, are displayed closer to the front side of the screen, regardless of the time-series order. That is, in the example of FIG. 7, the feature display areas are displayed close to the front side of the screen to be large, thereby displaying the feature display areas in a different way from the normal display areas. However, the method of differentiating the ways of displaying the feature display areas and the normal display areas is not limited thereto. For example, the display image generation unit 70 may differentiate the ways of displaying the feature display areas and the normal display areas by making a movement trajectory of the feature display area different from that of the normal display area, making a movement trajectory of the feature display area longer than that of the normal display area, or making a movement speed or frequency of the feature display area higher than that of the normal display area. In addition, for example, the feature display area may be displayed in a different way, by adding a note to the feature display area with a character, a picture, or the like, to display the feature display area with emphasis.

In addition, as described above, the feature images may be ranked based on the number of parameters satisfying the predetermined conditions or the sum of the points, that is, by score. When the feature images are ranked in this way, the display image generation unit 70 may display the feature display areas (display areas QB and QD) in different ways for the respective rankings of the feature images. For example, when the ranking of the thumbnail 100D of the display area QD is higher than that of the thumbnail 100B of the display area QB, that is, when the score of the thumbnail 100D is higher than that of the thumbnail 100B, the display image generation unit 70 arranges the display area QD to be closer to the front side of the screen than the display area QB, such that the display area QD is larger than the display area QB. In addition, for example, the movement trajectory of the display area QD may be larger than that of the display area QB. By displaying the display areas Q in different ways for the respective rankings of the feature images as described above, it is easy for the user to detect a feature image, which is a scene that is assumed to be highly likely to be desired by the user to view.

It should be noted that, although the display image P1 displaying the feature display areas with emphasis as illustrated in FIG. 7 is displayed in place of the display image P1 illustrated in FIG. 5, the display image P1 illustrated in FIG. 5 and the display image P1 illustrated in FIG. 7 may be switchably displayed. In addition, the display image P1 displaying the feature display areas with emphasis as illustrated in FIG. 7 may be used in a fixed thumbnail mode of FIG. 8, which will be described later.

Figure 8:
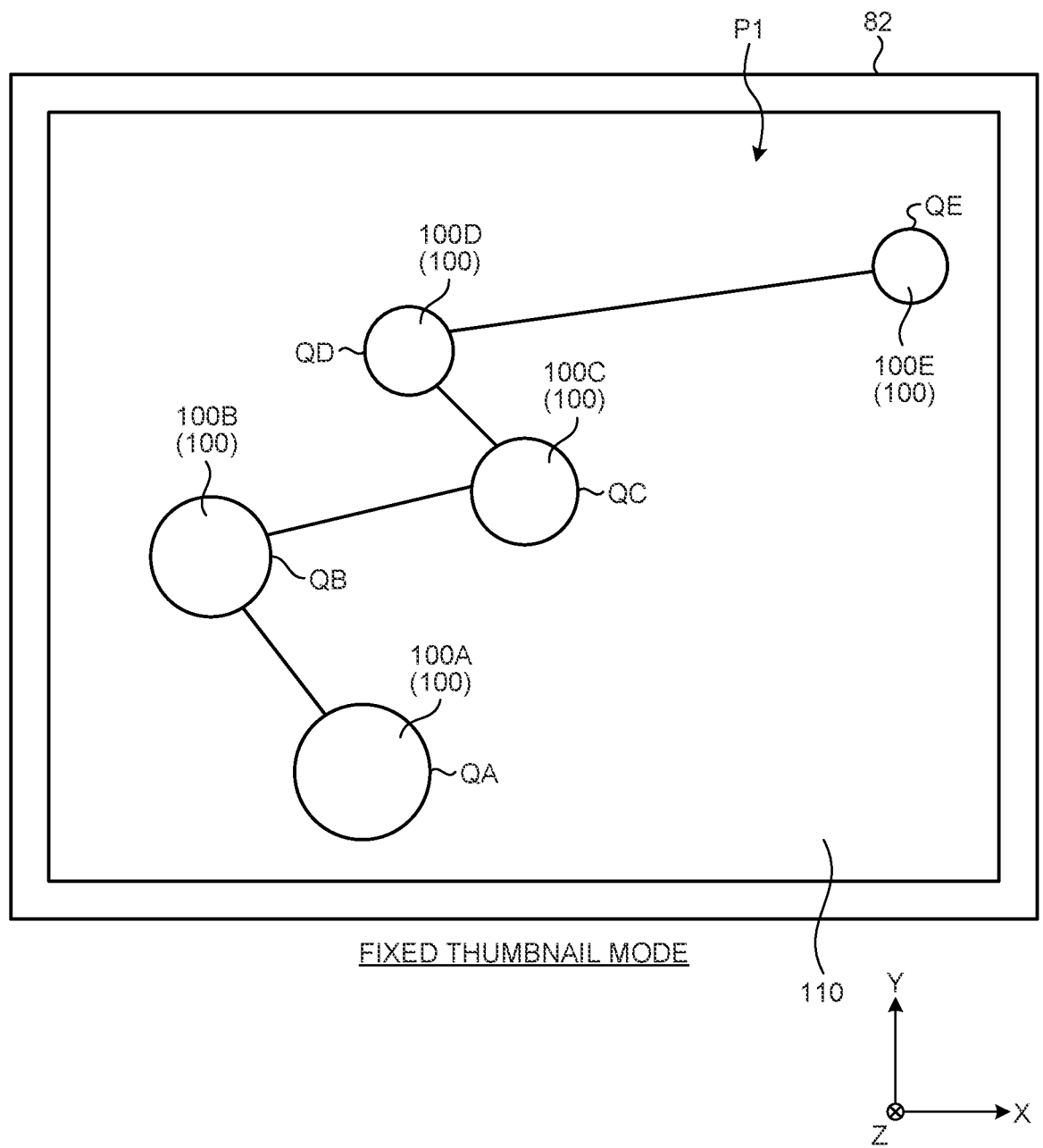
FIG. 8 is a diagram illustrating an example of a display image.

FIG. 8 is a diagram illustrating an example of a display image. As illustrated in FIG. 5, the display image generation unit 70 generates a display image P1 in a thumbnail mode in which the display areas Q rotate. However, the display image generation unit 70 may also generate a display image P1 in a display mode other than the thumbnail mode. FIG. 8 illustrates a display image P1 in the fixed thumbnail mode. As illustrated in FIG. 8, the display image P1 in the fixed thumbnail mode is different from the display image P1 in the thumbnail mode in that the display areas Q do not rotate and the rotation of the display areas Q is stopped. In this case, the thumbnails 100 displayed on the display areas Q are displayed while not being changed in angle, and thus are displayed as images whose angles are fixed in a predetermined direction. In other words, the display image generation unit 70 generates the display image P1 so that the angles of the thumbnails 100 are fixed in the predetermined direction in the fixed thumbnail mode.

More specifically, it is preferable that the display image generation unit 70 generates the display image P1 such that angles of all the thumbnails 100 displayed in the fixed thumbnail mode are identical in the predetermined direction. That is, the display image generation unit 70 arranges the angles of the thumbnails 100 in a constant direction, that is, in the identical predetermined direction. By arranging the angles of the thumbnails 100 in the identical predetermined direction as described above, the thumbnails 100 in the fixed thumbnail mode are displayed as images captured in the same direction, that is, in the identical predetermined direction. The angle direction of the thumbnails 100, i.e. the predetermined direction, may be arbitrarily set, but is preferably, for example, the travelling direction V1 of the vehicle V. By setting the angles of all the thumbnails 100 to the travelling direction V1 of the vehicle V, all the thumbnails 100 are images showing the travelling direction V1. Therefore, the display image P1 is an image in which the thumbnails 100 whose images are captured in the travelling direction V1 are arrayed on the time-series basis, and the user visually recognizing it can relive the movement by the vehicle V. In addition, the angle direction may be opposite to the travelling direction V1. In this case, it can be said that the angle direction is set based on the travelling direction V1. Thus, all the thumbnails 100 are images showing directions set based on the travelling direction V1. In addition, the angle direction may be a predetermined direction in the absolute coordinate (e.g. any one of east, west, south, and north directions). By setting the angles of all the thumbnails 100 to the predetermined directions in the absolute coordinate in this way, all the thumbnails 100 are images showing the predetermined directions in the absolute coordinate. In addition, in the fixed thumbnail mode, the display image generation unit 70 may stop the movement of the display areas Q in the directions X, Y, and Z, that is, floating, or may keep the display areas Q floating. It should be noted that an image P0 may be displayed together with the thumbnails 100 in the fixed thumbnail mode. In this case, the image P0 is an image indicating an angle direction of the thumbnail 100. For example, the angle direction of the thumbnail 100 is a direction of the image P0*b*.

Switching between the thumbnail mode and the fixed thumbnail mode is performed, for example, by a user's control (setting). When the display image P1 in the thumbnail mode is displayed on the display unit 82, if setting is made to perform switching, the display image generation unit 70 generates a display image P1 in the fixed thumbnail mode and transmits the generated display image P1 to the display terminal 16. The display terminal 16 acquires the display image P1 in the fixed thumbnail mode through the display image acquisition unit 90, and switches the display image P1 in the thumbnail mode to the display image P1 in the fixed thumbnail mode through the display control unit 92. Switching from the fixed thumbnail mode to the thumbnail mode is performed in the same manner.

FIG. 9 is a diagram illustrating another example of a display image. As illustrated in FIG. 9, the display image generation unit 70 may generate a display image P1 in a sort mode, which is a display mode other than the thumbnail mode. As illustrated in FIG. 9, in the sort mode, the thumbnails 100 are arrayed in time-series order in one direction (here, direction X). Then, the thumbnails 100 are arrayed in a direction (here, direction Y) different from the one direction in order of score calculated at the time of extracting the feature images. That is, the higher the score is, the closer to a direction (here, direction Y) different from the one direction the thumbnail 100 is positioned. That is, in the sort mode, the thumbnail 100 is sorted based on the score, i.e. an assumed degree to which the user is highly likely to request the thumbnail 100 to be viewed. It should be noted that, although an arrow for time along the direction X and an arrow for score along the direction Y are displayed in FIG. 9, these arrows may not actually be displayed. In addition, in the sort mode, the thumbnails 100 may be sorted based on a parameter other than the score. It should also be noted that, although the display areas Q do not rotate in the sort mode, the display areas Q may be rotated. In addition, when the display areas Q do not rotate in the sort mode, an image P0 may also be displayed together with the thumbnails 100. That is, the display image generation unit 70 may display the image P0 in a display mode in which the display areas Q do not rotate, and may not display the image P0 in a display mode in which the display areas Q rotate.

Switching between the thumbnail mode and the sort mode is performed, for example, by a user's control (setting). When the display image P1 in the thumbnail mode is displayed on the display unit 82, if setting is made to perform switching, the display image generation unit 70 generates a display image P1 in the sort mode and transmits the generated display image P1 to the display terminal 16. The display terminal 16 acquires the display image P1 in the sort mode through the display image acquisition unit 90, and switches the display image P1 in the thumbnail mode to the display image P1 in the sort mode through the display control unit 92. Switching from the thumbnail mode to the sort mode is performed in the same manner. In addition, the fixed thumbnail mode and the sort mode can be switched in the same manner. However, the display image generation unit 70 is not limited to generating display images P1 for all of the thumbnail mode, the fixed thumbnail mode, and the sort mode, and it is only required that the display image generation unit 70 generate a display image P1 for at least one of the thumbnail mode, the fixed thumbnail mode, and the sort mode.

A method of displaying the above-described display image P1 will be described based on a flowchart. FIG. 10 is a flowchart illustrating a method of displaying a display image. When displaying the display image P1, the image capturing device 10 first captures images P while moving, and the in-vehicle device 12 acquires position information for each movement. As illustrated in FIG. 10, the display control system 1 acquires information on images P through the image information acquisition unit 60 of the external device 14 (Step S10). In the present embodiment, the image information acquisition unit 60 acquires images P (image data) and position information as the information on images P from the in-vehicle device 12. Upon acquiring the information on images P, the display control system 1 associates a direction in an image P with that in an absolute coordinate through the image direction determination unit 62 of the external device 14 (Step S12). That is, the image direction determination unit 62 calculates what direction in the absolute coordinate the direction in the image P indicates.

Thereafter, the display control system 1 analyzes the information on images P and detects feature times through the image analysis unit 64 of the external device 14 (Step S14). That is, the image analysis unit 64 extracts feature images, which are assumed to be highly likely to be desired by a user to view, among the images P, and detects times at which the feature images are captured as the feature times. After detecting the feature times, the display control system 1 designates set times through the set time designation unit 66 of the external device 14 (Step S16). In the present embodiment, the set time designation unit 66 designates provisional times and the feature times as the set times. After setting the set times, the display control system 1 acquires images P captured at the set times as thumbnails 100 through the thumbnail acquisition unit 68 of the external device 14 (Step S18), and generates an image in which the thumbnails 100 are arrayed on a times-series basis as the display image P1 through the display image generation unit 70. Upon generating the display image P1, the display control system 1 displays the display image P1 on the display unit 82 of the display terminal 16 (Step S20).

As described above, the display control device (here, external device 14) according to the present embodiment includes an image information acquisition unit 60, a set time designation unit 66, a thumbnail acquisition unit 68, and a display image generation unit 70. The image information acquisition unit 60 acquires information on a plurality of images P captured while moving. Based on the information on images P, the set time designation unit 66 designates a plurality of set times different from each other within a period of time during which the images P are captured. The thumbnail acquisition unit 68 acquires images P captured at the set times as thumbnails 100. The display image generation unit 70 generates a display image P1 to be displayed on a display unit (the display unit 82 in the present embodiment) so that the plurality of acquired thumbnails 100 are arrayed in a predetermined direction (the direction Z in the present embodiment) in image-capturing time-series order while being displayed side by side in a direction different from the predetermined direction based on position information indicating positions at which the images P are captured.

The images P are captured while movement, thus causing a large amount of data. Thus, it may be difficult for a user to detect an image of a scene that the user wants to view from the images P. In this regard, the display control device according to the present embodiment generates the display image P1 such that the thumbnails 100 are arrayed not only on the time-series basis but also on the basis of the image-captured positions, with the thumbnails 100 being the images captured every set time. Therefore, according to this display control device, the user can adequately identify each of the plurality of thumbnails 100 by visually recognizing the thumbnails 100 arrayed on the time-series basis and on the basis of the image-captured positions, thereby appropriately detecting a desired scene from the captured images P. In addition, in the display image P1, the thumbnails 100 are arrayed on the time-series basis to display scenes for the respective movements in order. Accordingly, the user can relive the movement by visually recognizing the thumbnails 100, thereby looking back on the travel or the like in the vehicle V and having a comfortable experience. Further, in the display image P1, the thumbnails 100 are arrayed based on the positions. That is, the image information acquisition unit 60 acquires the information on positions at which the images P are captured (here, the position information of the vehicle V), and the display image generation unit 70 acquires the position information to array the plurality of thumbnails 100 in a direction (the direction X and the direction Y in the present embodiment) different from the predetermined direction based on the positions at which the images P are captured. Therefore, the user also can relive the movement route by visually recognizing the thumbnails 100, thereby more appropriately detecting an image of a scene that the user wants to view.

In addition, the position information includes information on travelling directions V1 at the time of capturing the images P, and the thumbnails 100 include a first thumbnail of a first set time and a second thumbnail of a second set time that is a later set time than the first set time. The display image generation unit 70 arranges the first thumbnail and the second thumbnail so that the second thumbnail is positioned in a travelling direction V1 from the first set time to the second set time with respect to the first thumbnail. In the display control device, the thumbnails 100 are arrayed on the time-series basis while being arrayed along the travelling direction V1. Therefore, the user can more adequately relive the movement route by visually recognizing the thumbnails 100, thereby more appropriately detecting an image of a scene that the user wants to view.

In addition, the set time designation unit 66 designates the set times based on the times (feature times) at which the feature images satisfying the predetermined conditions among the plurality of images P are captured. This causes the set time designation unit 66 to make different lengths between the set times, which are continuous on the time-series basis. The display control device designates the set times based on the times at which the feature images are captured. Accordingly, the thumbnail 100 is capable of displaying a feature image that is likely to be desired by a user to view, thereby enabling the user to more appropriately detect an image of a scene that the user wants to view.

In addition, the images P are 360-degree images. Thus, the display image generation unit 70 generates a display image P1 so that the thumbnails 100 are displayed on outer circumferential surfaces of spherical display areas Q in a virtual three-dimensional space displayed on the display unit. Also, the display image generation unit 70 generates the display image P1 so that, when the display areas Q rotate, the thumbnails 10 are displayed while being changed in angle according to the rotation of the display areas Q. In this way, the display image P1 is displayed so that the thumbnails 100 are changed in angle by rotating the spherical display areas Q. Therefore, in the display image P1, the 360-degree images can be displayed entirely as the thumbnails 100. That is, according to this display control device, the thumbnails 100 of the 360-degree images can be appropriately displayed.

In addition, the display image generation unit 70 generates a display image P1 in which the rotation of the display areas Q is stopped so that the respective thumbnails 100 are images showing an identical predetermined direction. According to this display control device, it is possible to switch between a thumbnail mode in which the display areas Q rotate and the 360-degree images are displayed entirely as the thumbnails 100 and a fixed thumbnail mode in which the rotation of the display areas Q is stopped and the images are displayed as the thumbnails 100 from a one-direction angle. Therefore, according to the display control device, the user can more appropriately detect an image P of a scene that the user wants to view by switching a way of displaying the thumbnails 100.

In addition, the display control device (here, the external device 14) according to the present embodiment includes a thumbnail acquisition unit 68 that acquires thumbnails 100 of images P, which are 360-degree images, and a display image generation unit 70. The display image generation unit 70 generates a display image P1 to be displayed on the display unit so that the acquired thumbnails 100 are displayed on outer circumferential surfaces of spherical display areas Q in a virtual three-dimensional space displayed on the display unit, and at the same time, the display areas Q rotate and the thumbnails 100 are displayed while being changed in angle according to the rotation of the display areas Q. According to this display control device, the 360-degree images can be displayed entirely as the thumbnails 100. That is, according to this display control device, the thumbnails 100 of the 360-degree images can be appropriately displayed. Therefore, according to this display control device, the user can appropriately detect a desired scene from the captured images P.

In addition, the display control system 1 according to the present embodiment includes a display control device, an image capturing device capturing images P, and a display unit (a display unit 82 in the present embodiment) that displays a display image P1. According to the display control system 1, the user can appropriately detect a desired scene from the captured images P by displaying the display image P1 through the display unit.

In addition, the image capturing device is installed in the vehicle V to capture images inside and outside the vehicle V. According to the display control system 1, the user can appropriately detect a desired scene from the images P captured inside and outside the vehicle, and also can relive the movement in the vehicle V.

In the present embodiment, it should be noted that the display unit that displays the display image P1 is the display unit 82 of the display terminal 16. However, the display image P1 may be displayed on any device in the display control system 1, and for example, may be displayed on the display unit 32 of the in-vehicle device 12 or the display unit 52 of the external device 14.

In addition, the external device 14 constitutes the display control device to generate the display image P1 in the present embodiment, but any device in the display control system 1 may constitute the display control device for generating the display image P1. For example, as illustrated in FIG. 11, a display terminal 16A may constitute the display control device. FIG. 11 is a block diagram illustrating another example of a display control system according to the present embodiment. In the following description of a display control system 1A of FIG. 11, the description of parts having the same configuration as those in the display control system 1 illustrated in FIG. 3 will be omitted.

The display control system 1A in the example illustrated in FIG. 11 includes an external device 14A and a display terminal 16A. A control unit 58A of the external device 14A includes an image information acquisition unit 60 that acquires information on images P, here images P and position information, from an in-vehicle device 12. A control unit 88A of the display terminal 16A includes an image information acquisition unit 90A, an image direction determination unit 62A, an image analysis unit 64A, a set time designation unit 66A, a thumbnail acquisition unit 68A, a display image generation unit 70A, and a display control unit 92.

The image information acquisition unit 90A acquires the information on images P acquired by the external device 14A, here images P and position information. The image direction determination unit 62A associates a direction in an image P with a direction in an absolute coordinate in the same manner as the image direction determination unit 62 illustrated in FIG. 3. The image analysis unit 64A detects feature times in the same manner as the image analysis unit 64 illustrated in FIG. 3, and the set time designation unit 66A designates set times in the same manner as the set time designation unit 66 illustrated in FIG. 3. Further, the thumbnail acquisition unit 68A acquires thumbnails 100 in the same manner as the thumbnail acquisition unit 68 illustrated in FIG. 3, and the display image generation unit 70A generates a display image P1 in the same manner as the display image generation unit 70 illustrated in FIG. 3. The display control unit 92 causes the display unit 82 to display the display image P1 generated by the display image generation unit 70A thereon.

As described above, in the display control system 1A illustrated in FIG. 11, the display terminal 16A constitutes the display control device. That is, the display terminal 16A not only generates the display image P1 but also displays the generated display image P1. It should be noted that, in FIG. 11, the display control system 1A may not include the external device 14, and the in-vehicle device 12 may transmit the information on images P to the display terminal 16A.

In addition, for example, the in-vehicle device 12 may also constitute the display control device. That is, in this case, the display control system 1 may not include the external device 14, and the display image P1 generated by the in-vehicle device 12 may be transmitted from the in-vehicle device 12 to the display terminal 16. In addition, in this case, the in-vehicle device 12 may display the generated display image P1 on its own display unit 32. In addition, even in this case, the display control system 1 may include the external device 14, and the display image P1 generated by the in-vehicle device 12 may be transmitted to the external device 14 and then transmitted from the external device 14 to the display terminal 16.

As described above, the display control device has functions as an image information acquisition unit, a thumbnail acquisition unit, a set time designation unit, and a display image generation unit. Thus, any device in the display control system 1 may constitute the display control device as long as it generates a display image P1. In addition, the display control device may be constituted by a plurality of devices. For example, the following configuration is also possible. That is, the external device 14 stores images P, extracts feature images, and detects feature times. The external device 14 transmits the feature times as information on images P to the display terminal 16. The display terminal 16 sets set times based on the feature times, and transmits information on the set times to the external device 14. The external device 14 generates thumbnails 100 based on the set times, and generates a display image P1 in which the thumbnails 100 are arrayed. The display terminal 16 acquires the display image P1 and displays the acquired display image P1 on the display unit 82. In this case, since the display terminal 16 does not acquire image data or position information as the information on images P, it is possible to suppress an amount of data subject to communication.

According to the present embodiment, the scene desired by the viewer can be appropriately detected from the captured images.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A display control device comprising:
a processor configured to perform operations, the operations comprising:
acquiring information on a plurality of images captured during movement;
designating a plurality of set times based on the information on images;
acquiring the images captured at the set times as thumbnails; and
generating a display image to be displayed on a display unit so that the plurality of acquired thumbnails are arrayed in a predetermined direction in image-capturing time-series order while being displayed side by side in a direction different from the predetermined direction based on position information indicating positions at which the images are captured, wherein
the images are 360-degree images, and
the generating generates the display image so that the thumbnails are displayed on outer circumferential surfaces of spherical display areas in a virtual three-dimensional space displayed on the display unit, while being changed in angle by the processor being configured to rotate the display areas in different directions or at different speeds,
wherein the designating designates the set times based on times at which feature images satisfying predetermined conditions among the plurality of images are captured, so that lengths between the set times that are continuous on a time-series basis are different from each other, and wherein the display areas are rotated in the different directions or at the different speeds between the thumbnails extracted as the feature images and the thumbnails not extracted as the feature images.

2. The display control device according to claim 1, wherein the position information includes information on travelling directions at the time of capturing the images, the thumbnails include a first thumbnail of a first set time and a second thumbnail of a second set time that is a later set time than the first set time, and the generating arranges the first thumbnail and the second thumbnail so that the second thumbnail is positioned in the travelling direction from the first set time to the second set time with respect to the first thumbnail.

3. The display control device according to claim 1, wherein the generating generates the display image in which the rotation of the display areas is stopped so that the respective thumbnails are images showing an identical predetermined direction.

4. A non-transitory computer readable recording medium storing therein a program for causing a processor of a computer to execute:

acquiring information on a plurality of images captured during movement;

designating a plurality of set times based on the information on images;

acquiring the images captured at the respective set times as thumbnails; and generating a display image to be displayed on a display unit so that the plurality of acquired thumbnails are arrayed in a predetermined direction in image-capturing time-series order while being displayed side by side in a direction different from the predetermined direction based on position information indicating positions at which the images are captured, wherein the images are 360-degree images, and the generating generates the display image so that the thumbnails are displayed on outer circumferential surfaces of spherical display areas in a virtual three-dimensional space displayed on the display unit, while being changed in angle by the program causing the processor to execute rotation of the display areas in any different directions or at different speeds, wherein the designating designates the set times based on times at which feature images satisfying predetermined conditions among the plurality of images are captured, so that lengths between the set times that are continuous on a time-series basis are different from each other, and wherein the display areas are rotated in the different directions or at the different speeds between the thumbnails extracted as the feature images and the thumbnails not extracted as the feature images.

5. The non-transitory computer readable recording medium according to claim 4, wherein the position information includes information on travelling directions at the time of capturing the images, the thumbnails include a first thumbnail of a first set time and a second thumbnail of a second set time that is a later set time than the first set time, and the generating arranges the first thumbnail and the second thumbnail so that the second thumbnail is positioned in the travelling direction from the first set time to the second set time with respect to the first thumbnail.

6. The non-transitory computer readable recording medium according to claim 4, wherein the generating generates the display image in which the rotation of the display areas is stopped so that the respective thumbnails are images showing an identical predetermined direction.

7. A display control method comprising:

acquiring information on a plurality of images captured during movement;

designating a plurality of set times based on the information on images;

acquiring the images captured at the set times as thumbnails; and generating a display image to be displayed on a display unit so that the plurality of acquired thumbnails are arrayed in a predetermined direction in image-capturing time-series order while being displayed side by side in a direction different from the predetermined direction based on position information indicating positions at which the images are captured, wherein the images are 360-degree images, and the generating generates the display image so that the thumbnails are displayed on outer circumferential surfaces of spherical display areas in a virtual three-dimensional space displayed on the display unit, while being changed in angle by rotating the display areas in different directions or at different speeds, wherein the designating designates the set times based on times at which feature images satisfying predetermined conditions among the plurality of images are captured, so that lengths between the set times that are continuous on a time-series basis are different from each other, and wherein the display areas are rotated in the different directions or at the different speeds between the thumbnails extracted as the feature images and the thumbnails not extracted as the feature images.

8. The display control method according to claim 7, wherein the position information includes information on travelling directions at the time of capturing the images, the thumbnails include a first thumbnail of a first set time and a second thumbnail of a second set time that is a later set time than the first set time, and the generating arranges the first thumbnail and the second thumbnail so that the second thumbnail is positioned in the travelling direction from the first set time to the second set time with respect to the first thumbnail.

9. The display control method according to claim 7, wherein the generating generates the display image in which the rotation of the display areas is stopped so that the respective thumbnails are images showing an identical predetermined direction.

10. The display control device according to claim 1, wherein the display areas comprise a first display area and a second display area, wherein the rotating of the display areas further comprises:

rotating the first display area in a first direction at a first speed; and rotating the second display area in a second direction that is different from the first direction and at a second speed that is different than the first speed.

* * * * *